United States Patent
Aio et al.

(10) Patent No.: US 12,206,470 B2
(45) Date of Patent: Jan. 21, 2025

(54) WIRELESS COMMUNICATION DEVICE AND METHOD, AND WIRELESS COMMUNICATION TERMINAL

(71) Applicant: Sony Group Corporation, Tokyo (JP)

(72) Inventors: Kosuke Aio, Tokyo (JP); Ken Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 513 days.

(21) Appl. No.: 17/619,254

(22) PCT Filed: Jun. 26, 2020

(86) PCT No.: PCT/JP2020/025167
§ 371 (c)(1),
(2) Date: Dec. 15, 2021

(87) PCT Pub. No.: WO2021/010133
PCT Pub. Date: Jan. 21, 2021

(65) Prior Publication Data
US 2022/0360300 A1 Nov. 10, 2022

(30) Foreign Application Priority Data

Jul. 12, 2019 (JP) ................. 2019-129874
Mar. 13, 2020 (JP) ................. 2020-043820

(51) Int. Cl.
*H04W 24/10* (2009.01)
*H04B 7/0417* (2017.01)
*H04B 7/06* (2006.01)

(52) U.S. Cl.
CPC ......... *H04B 7/0417* (2013.01); *H04B 7/0643* (2013.01); *H04W 24/10* (2013.01)

(58) Field of Classification Search
CPC .. H04B 7/0417; H04B 7/0643; H04B 7/0626; H04B 7/024; H04W 24/10
See application file for complete search history.

(56) References Cited

U.S. PATENT DOCUMENTS

2017/0170939 A1   6/2017   Huang
2018/0054240 A1   2/2018   Cariou
(Continued)

FOREIGN PATENT DOCUMENTS

WO      2010/125635 A1    11/2010
WO      2018/106274 A1     6/2018
WO   WO-2019066867 A       4/2019

OTHER PUBLICATIONS

International Search Report and Written Opinion mailed on Sep. 8, 2020, received for PCT Application PCT/JP2020/025167, Filed on Jun. 26, 2020, 9 pages including English Translation.
(Continued)

*Primary Examiner* — Chuong A Ngo
(74) *Attorney, Agent, or Firm* — XSENSUS LLP

(57) ABSTRACT

The present technology relates to a wireless communication device and method, and a wireless communication terminal capable of reducing a processing time. The wireless communication device causes a wireless transmission unit to transmit a reference signal in a known pattern addressed to a wireless communication terminal in coordination with one or more other wireless communication devices, generates a request signal for requesting a second measurement result simpler than a first measurement result of the reference signal from the wireless communication terminal, and causes the wireless transmission unit to transmit the request signal. The present technology can be applied to a communication system.

20 Claims, 30 Drawing Sheets

(56) References Cited

U.S. PATENT DOCUMENTS

2018/0234135 A1    8/2018  Vermani
2019/0327629 A1*  10/2019  Zhang .................. H04B 7/0645
2020/0067612 A1*  2/2020  Wu ....................... H04L 1/0026

OTHER PUBLICATIONS

Lou et al., "Feedback overhead analysis for 16 spatial stream MIMO", IEEE 802.11-19/0828r0, May 2019, 15 pages.

Aio et al., "Consideration on Multi-AP Sounding", IEEE 802.11-19/11340, Jul. 2019, 14 pages.

Ron Porat (Broadcom): "NDP Feedback Report Design 11-17-0044-00-00ax-ndp-feedback-report-design", IEEE Draft; Jan. 16, 2017 (Jan. 16, 2017), pp. 1-19, vol. 802.llax, IEEE-SA Mentor,Piscataway, NJ USA.

Li-Glass / Hsiang Sun(Interdigital) , "Feedback Overhead Analysis for 16 Spatial Stream MIMO" , IEEE 802.11-19/0828r0 , IEEE, May 22, 19, 14 pgs.

* cited by examiner

Fig. 22

| EMBODIMENT | CONTENT OF FEEDBACK SIGNAL | CONTENT OF FEEDBACK SIGNAL |
|---|---|---|
| 1 | DETERMINE THROUGH Short Req./Resp. (TRANSMISSION WEIGHT INFORMATION OF AP1+AP2 OR TRANSMISSION WEIGHT INFORMATION OF CONNECTION DESTINATION AP) | EITHER ONE OF APs |
| 2 | DETERMINE THROUGH Short Req./Resp. (TRANSMISSION WEIGHT INFORMATION OF AP1+AP2 OR TRANSMISSION WEIGHT INFORMATION OF CONNECTION DESTINATION AP) | CONNECTION DESTINATION AP |
| 3 | DETERMINE THROUGH Short Req./Resp. (TRANSMISSION WEIGHT INFORMATION OF AP1+AP2 OR TRANSMISSION WEIGHT INFORMATION OF AP2) | EITHER ONE OF APs |
| 4 | TRANSMISSION WEIGHT INFORMATION OF AP1+AP2 | DETERMINE THROUGH Short Req./Resp. (CONNECTION DESTINATION AP OR ANOTHER AP) |

WIRELESS COMMUNICATION DEVICE AND METHOD, AND WIRELESS COMMUNICATION TERMINAL

CROSS-REFERENCE TO RELATED APPLICATIONS

The present application is based on PCT filing PCT/JP2020/025167, filed Jun. 26, 2020, which claims priority to Japanese Patent Applications No. 2019-129874, filed on Jul. 12, 2019 and 2020-043820, filed on Mar. 13, 2020, the entire contents of each are incorporated herein by reference.

TECHNICAL FIELD

The present technology relates to a wireless communication device and method, and a wireless communication terminal, and particularly, to a wireless communication device and method, and a wireless communication terminal capable of reducing a processing time.

BACKGROUND ART

In IEEE 802.11 that establishes standards of wireless LANs, Multi-Input Multi-Output (MIMO) technology standardized in 802.11n can transmit a plurality of pieces of data to both an AP that is a base station and an STA that is a terminal using a plurality of wireless modules and antennas.

However, to determine a transmission weight for MIMO communication, a channel state of each communication link (how a transmitted signal has been received by an STA) is necessary. As a method, there is Explicit Beamforming that determines a transmission weight using sounding processing. Sounding processing is processing through which an AP transmits a reference signal in a known pattern (known signal) and allow an STA to transmit transmission weight information as a feedback signal (refer to PTL 1).

CITATION LIST

Patent Literature

[PTL 1]
WO 2010/125635

SUMMARY

Technical Problem

In the aforementioned sounding processing, a considerably large amount of information needs to be transmitted in order for an STA to transmit transmission weight information as a feedback signal to an AP. Furthermore, when an AP acquires transmission weight information from a plurality of STAs, the feedback signal transmission time considerably increases because communication resources that can be allocated to a feedback signal of each STA are limited.

The present technology has been made in view of such a situation, and makes it possible to reduce a processing time.

Solution to Problem

A wireless communication device of one aspect of the present technology includes a wireless transmission unit, and a communication control unit configured to cause the wireless transmission unit to transmit a reference signal in a known pattern addressed to a wireless communication terminal in coordination with one or more other wireless communication devices, to generate a request signal for requesting a second measurement result simpler than a first measurement result of the reference signal from the wireless communication terminal, and to cause the wireless transmission unit to transmit the request signal.

A wireless communication terminal of another aspect of the present technology includes a communication control unit configured to, on the basis of a reference signal in a known pattern transmitted from a plurality of wireless communication devices in a coordinated manner, generate a second measurement result simpler than a first measurement result of the reference signal, and a wireless transmission unit configured to transmit a response signal including the second measurement result to the wireless communication device that is a request destination on the basis of a request signal for requesting the second measurement result.

In one aspect of the present technology, a reference signal in a known pattern addressed to a wireless communication terminal is transmitted to the wireless transmission unit in coordination with one or more other wireless communication devices. Then, a request signal for requesting a second measurement result simpler than a first measurement result of the reference signal from the wireless communication terminal is generated and transmitted.

In another aspect of the present technology, on the basis of a reference signal in a known pattern transmitted from a plurality of wireless communication devices in a coordinated manner, a second measurement result simpler than a first measurement result of the reference signal is generated. Then, a response signal including the second measurement result is transmitted to the wireless communication device that is a request destination on the basis of a request signal for requesting the second measurement result.

BRIEF DESCRIPTION OF DRAWINGS

FIG. 22 is a diagram illustrating features of first to fourth embodiments of the present technology.

DESCRIPTION OF EMBODIMENTS

Hereinafter, embodiments of the present technology will be described. Description will be given in the following order.
1. Background
2. System Configuration and Device Configuration
3. First Embodiment
4. Second Embodiment
5. Third Embodiment
6. Fourth Embodiment
7. Others

1. BACKGROUND

In IEEE 802.11 that establishes standards of wireless LANs, Multi-Input Multi-Output (MIMO) technology standardized in 802.11n can transmit a plurality of pieces of data to both an AP (access point) that is a base station and an STA (station) that is a terminal using a plurality of wireless modules and antennas. Accordingly, throughput improvement and reliability improvement are realized.

The MIMO technology evolves whenever a new standard is established. In 802.11ac, for example, a down link (DL) MU-MIMO technology in which an AP allocates a plurality of pieces of data to a plurality of STAs and performs multi-user communication was established. In addition, in 802.11ax, an up link (UL) MU-MIMO technology in which a plurality of STAs perform multi-user communication for an AP was established.

<DL Mu-MIMO Technology>

Figure 1:
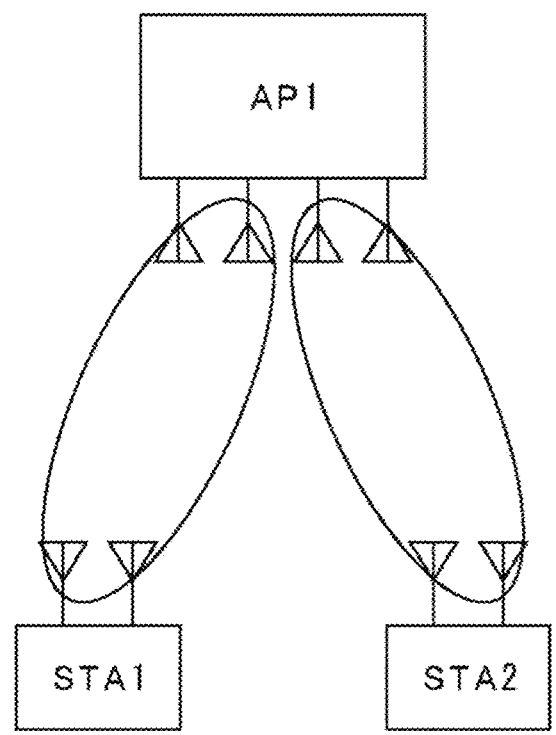
FIG. 1 is a diagram illustrating an example of a DL MU-MIMO technology.

FIG. 1 is a diagram illustrating an example of the DL MU-MIMO technology.

In FIG. 1, AP1, STA1, and STA2 are connected through wireless communication.

In the case of DL MU-MIMO, the single AP1 transmits data to STA1 and STA2. In that case, AP1 performs transmission weight processing such that a signal addressed to another STA does not arrive at each STA. Accordingly, STA1 and STA2 can extract and receive only data addressed thereto.

In IEEE 802.11, establishment of standards of 802.11be succeeding 802.11ax started in May 2019. As a candidate technology for 802.11be, an AP coordinated technology may be conceived.

<AP Coordinated Technology>

Figure 2:
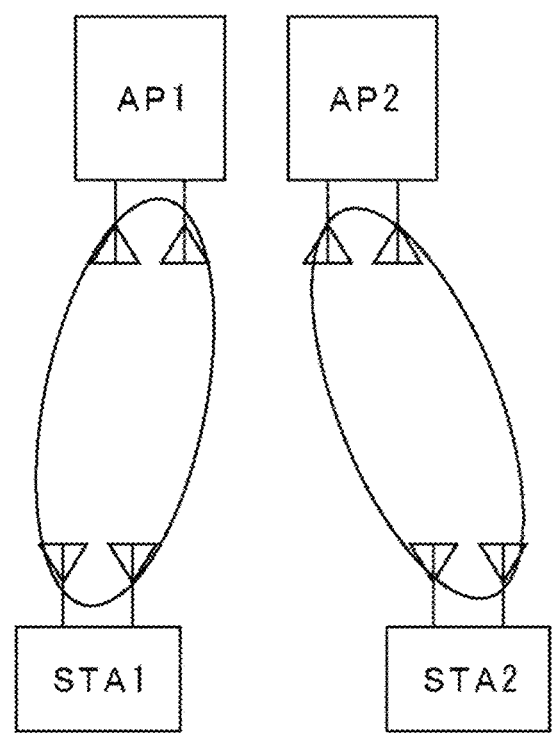
FIG. 2 is a diagram illustrating an example of an AP coordinated technology.

FIG. 2 is a diagram illustrating an example of AP coordinated technology.

In FIG. 2, AP1, AP2, STA1, and STA2 are connected through wireless communication.

AP1 and AP2 transmit data to STA1 and STA2. AS illustrated in FIG. 2, AP coordinated technology is basically characterized in that STA1 more easily receives data from AP1 closer thereto than AP2 and STA2 more easily receives data from AP2 closer thereto than AP1.

In the AP coordinated technology illustrated in FIGS. 2, AP1 and AP2 perform the transmission weight processing described above in FIG. 1 in cooperation. For example, when AP1 transmits data to STA1, AP1 controls a beam such that STA2 is free from interference. Likewise, when AP2 transmits data to STA2, AP2 controls a beam such that STA1 is free from interference. Accordingly, AP1 and AP2 can simultaneously transmit data without interfering with each other and thus can realize throughput improvement. In addition, the advantage that the number of antennas per AP can be reduced can also be expected as compared to FIG. 1.

Further, a plurality of APs can transmit data to the same STA in cooperation, for example, to improve reception quality of the STA according to the AP coordinated technology.

However, to perform MIMO communication, an AP performs appropriate signal processing (multiplication of a transmission weight) on a signal radiated from each antenna and transmits the signal. To determine such a transmission weight, a channel state of each communication link (how a transmitted signal has been received by an STA) is necessary. As a method, there is Explicit Beamforming that determines a transmission weight using sounding processing. Sounding processing is processing through which an AP transmits a reference signal in a known pattern (known signal) and causes an STA to transmit transmission weight information as a feedback signal.

<Sounding Processing>

Figure 3:
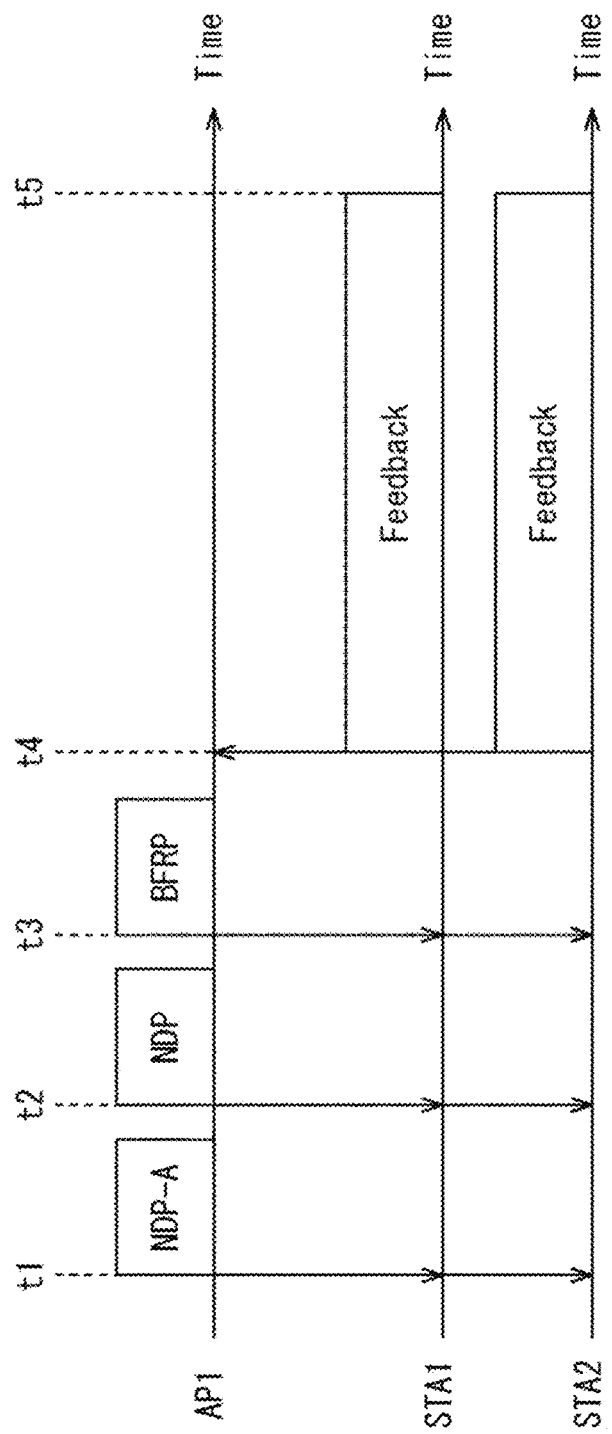
FIG. 3 is a diagram illustrating an example of sounding processing.

FIG. 3 is a diagram illustrating an example of sounding processing.

FIG. 3 illustrates sounding processing in Explicit Beamforming defined in IEEE 802.11ax.

AP1 transmits an NDP announcement (hereinafter NDP-A) frame for notifying STA1 and STA2 of transmission of a null data packet (NDP) frame that is a reference signal in a known pattern at time t1. AP1 transmits the NDP frame at time t2.

In addition, when AP1 simultaneously receives feedback signals from STA1 and STA2, AP1 transmits a BFRP (Beamforming Report Poll) trigger frame for STA1 or STA2 to UL multiplex and transmit a feedback signal at time t3. A communication resource for each of STA1 and STA2 is designated in the BFRP trigger frame.

STA1 and STA2 estimate a channel state on the basis of a reception state of the NDP frame and calculate transmission weights when the received NDP-A frame includes information indicating STA1 and STA2. Although there are several transmission weight calculation methods, for example, a case of performing singular value decomposition of a channel matrix obtained according to an NDP frame reception state and using an acquired singular vector as a transmission weight is general.

STA1 and STA2 compress the amount of information of the calculated transmission weights using communication resources designated in the BFRP trigger frame at time t4. STA1 and STA2 transmit the information with the compressed amount (hereinafter, transmission weight information) to the AP as feedback signals. Upon reception of the feedback signals, the AP can obtain the transmission weight information calculated by the STAs from the acquired feedback signals.

As described above, to feedback transmission weights to an AP, an STA needs to transmit a considerably large amount of information. Furthermore, when an AP acquires transmission weight information from a plurality of STAs, a feedback signal transmission time considerably increases because communication resources that can be allocated to a feedback signal of each STA are limited.

Reduction in such a sounding processing time is also essential in communication from a single AP to a plurality of STAs. Particularly, when a multi-AP environment or AP coordination is assumed, the number of transmission antennas and the number of STAs tend to be large and thus measures for reducing the sounding processing time are urgently required.

Accordingly, in the present technology, an AP transmits an NDP frame in a known pattern, requests a second measurement result, which is information simpler than transmission weight information (hereinafter also referred to as a first measurement result) measured from a reception state of the NDP frame and is measured from the reception state of the NDP frame, from STAs in advance and acquires the second measurement result.

By acquiring the second measurement result, the AP can optimally determine information about a feedback signal including the first measurement result acquired from the STAs thereafter. The information about the feedback signal may include, for example, an STA from which a feedback signal is requested, the amount of information of the feedback signal, and communication resources of the feedback signal. Accordingly, it is possible to shorten a time taken to transmit and receive a feedback signal according to the present technology.

2. SYSTEM CONFIGURATION AND DEVICE CONFIGURATION

<Configuration Example of Communication System>

Figure 4:
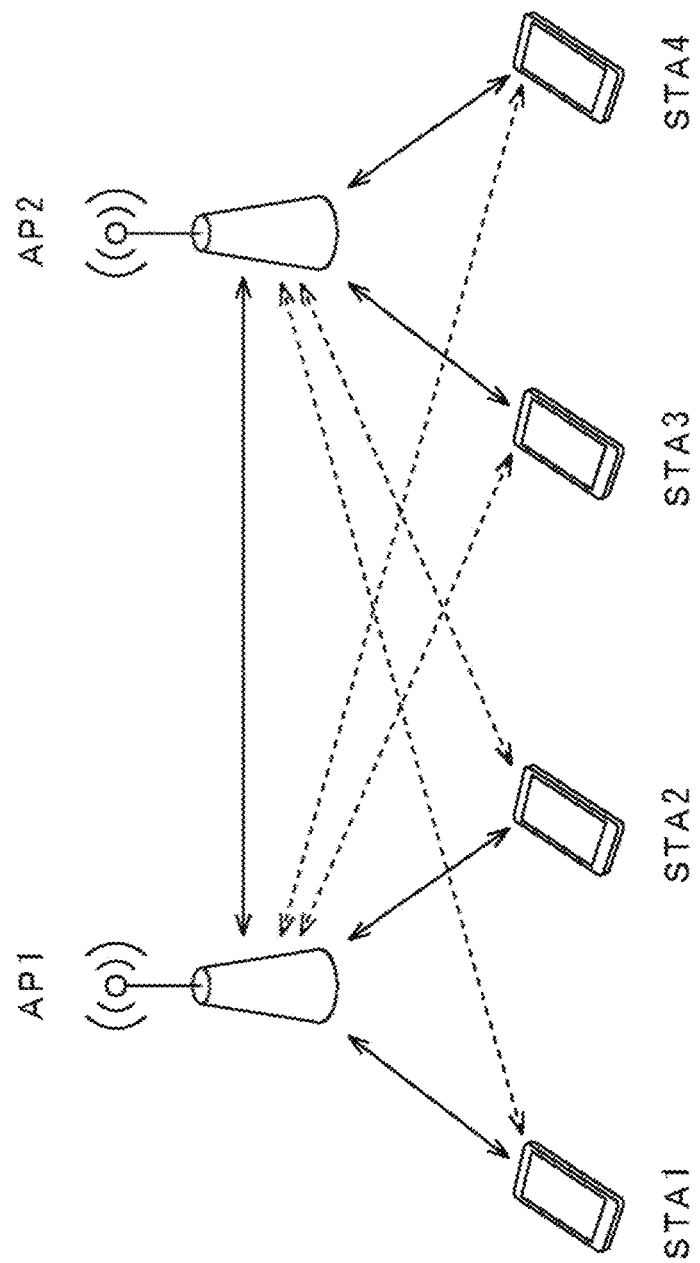
FIG. 4 is a diagram illustrating a configuration example of a communication system according to an embodiment of the present technology.

FIG. 4 is a diagram illustrating a configuration example of a communication system according to an embodiment of the present technology.

In FIG. 4, a solid-line arrow indicates that devices are connected to each other and a dotted-line arrow indicates that power is transmitted and received between devices.

The communication system in FIG. 4 is configured according to connection of AP1 and AP2 through wired communication or wireless communication. In addition, the communication system is configured according to connection of STA1 and STA2 to AP1 through wireless communication and connection of STA3 and STA4 to AP2 through wireless communication. STA1 and STA2 connected to AP1 through wireless communication are referred to as STAs subordinate to AP1. STA3 and STA4 connected to AP2 through wireless communication are referred to as STAs subordinate to AP2.

STA2 and STA3 are also close to APs other than connection destinations thereof and thus they are assumed to have a higher reception power for these APs other than their connection destinations than STA1 and STA4 which are further away from these APs other than their connection destinations.

Meanwhile, the system configuration that is a subject is not limited to the example of FIG. 4, and any configuration may be employed as long as a plurality of connected APs are present and STAs are connected to the respective APs as surrounding terminals. In addition, any positional relation is possible as long as the aforementioned positional relations are satisfied.

<Configuration Example of Communication Device>

Figure 5:
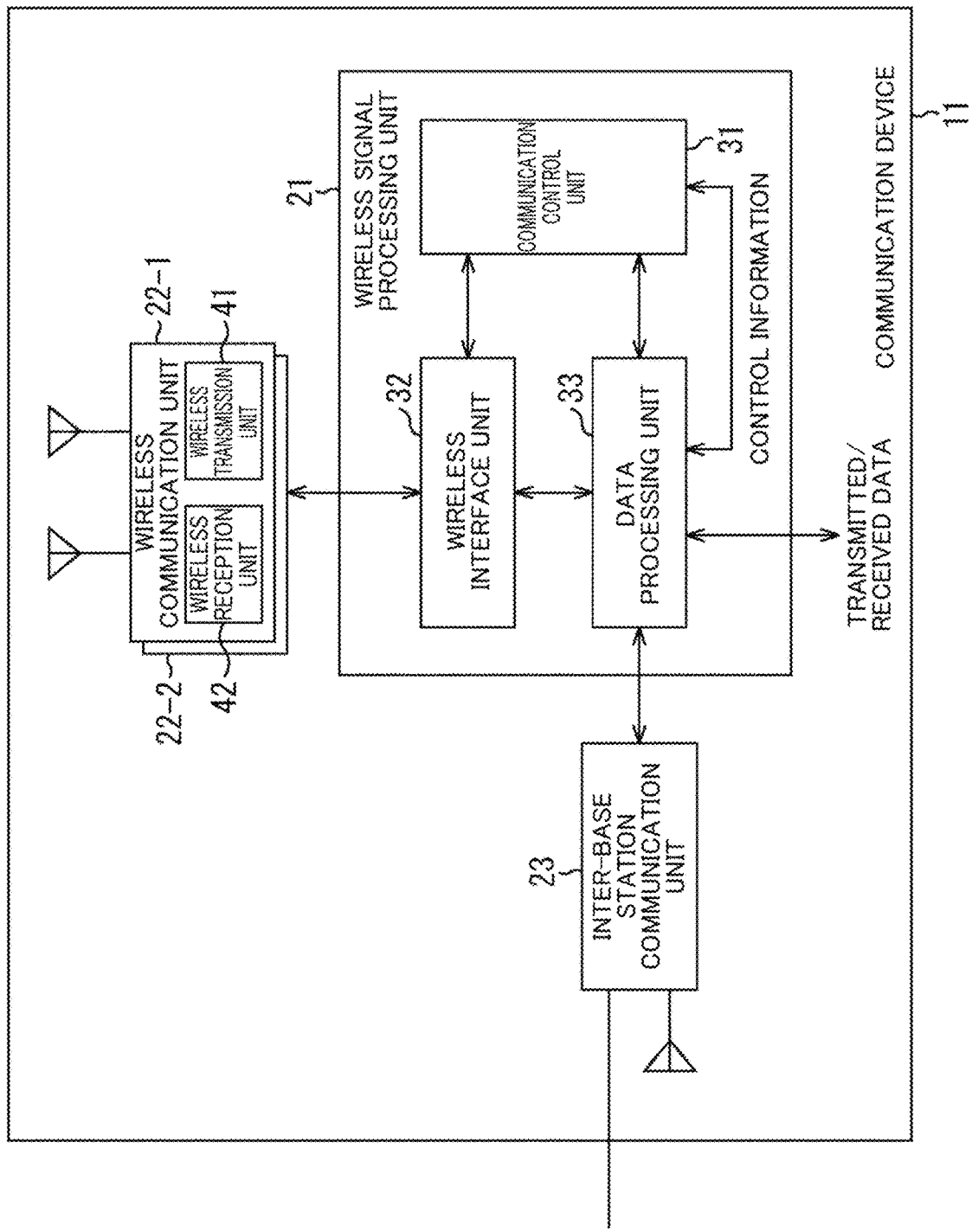
FIG. 5 is a block diagram illustrating a configuration example of a communication device.

FIG. 5 is a block diagram illustrating a configuration example of a communication device.

A communication device 11 illustrated in FIG. 5 is a device operating as an AP.

The communication device 11 includes a wireless signal processing unit 21, wireless communication units 22-1 and 22-2, and an inter-base station communication unit 23.

The wireless signal processing unit 21 controls communication with APs and communication with STAs.

The wireless signal processing unit 21 includes a communication control unit 31, a wireless interface unit 32, and a data processing unit 33.

The communication control unit 31 includes a central processing unit (CPU), a read only memory (ROM), and a random access memory (RAM). The communication control unit 31 executes a program stored in the ROM or the like and controls the overall operation of the communication device 11. The communication control unit 31 controls the wireless communication units 22-1 and 22-2 through the wireless interface unit 32 and sets communication resources and the like. In addition, the communication control unit 31 performs processing of transferring control information to be notified to other STAs to the data processing unit 33.

The communication control unit 31 acquires, for example, a short feedback response frame from an STA by transmitting a short feedback request frame that is a request signal for requesting a short feedback response frame including the second measurement result of an NDP after transmission of the NDP.

The communication control unit 31 determines a request destination of a feedback signal including the first measurement result, the amount of information of the feedback signal, and communication resources of the feedback signal on the basis of the acquired short feedback response frame.

The wireless interface unit 32 performs analog conversion on a transmission signal generated by the data processing unit 33 to convert the transmission signal from a digital signal into an analog signal. Further, the wireless interface unit 32 performs digital conversion on received signals acquired through the wireless communication units 22-1 and 22-2 to convert the received signals from analog signals into digital signals.

The data processing unit 33 generates a transmission signal on the basis of transmission data and the control information received from the communication control unit 31 and outputs the generated transmission signal to the wireless interface unit 32.

The data processing unit 33 performs processing of demodulating the received signal converted by the wireless interface unit 32 and extracting received data and control information. The data processing unit 33 outputs the extracted control information to the communication control unit 31 and outputs the extracted received data to a higher layer that is not illustrated.

In addition, the data processing unit 33 receives control information and data supplied from the inter-base station communication unit 23 and outputs the control information and the data to the communication control unit 31.

The wireless communication units 22-1 and 22-2 include antennas and perform wireless communication with STAs on the basis of communication resources set by the communication control unit 31. The wireless communication units 22-1 and 22-2 are referred to as a wireless communication unit 22 when they need not be particularly distinguished. Further, the wireless communication units 22 are not limited to two wireless communication units and there being a plurality of (n>1) wireless communication units 22-1 to 22-n is included.

The wireless communication unit 22 includes a wireless reception unit 41 and a wireless transmission unit 42.

The wireless reception unit 41 performs RF processing on a wireless signal supplied from an antenna to generate a received signal and outputs the received signal to the wireless interface unit 32.

The wireless transmission unit 42 performs RF processing on a transmission signal supplied from the wireless interface unit 32 to generate a wireless signal. The wireless transmission unit 42 outputs the generated wireless signal to an antenna.

Meanwhile, electromagnetic waves received through an antenna are output to the wireless reception unit 41 as a wireless signal. In addition, the antenna radiates a wireless signal generated by the wireless transmission unit 42 as electromagnetic waves.

The inter-base station communication unit 23 performs processing of notifying or acquiring control information and data necessary for coordination between APs. The inter-base station communication unit 23 includes an antenna, and communication between APs may be wired or wireless communication. When communication between APs is wireless communication, the wireless communication unit 22 may be configured to execute the function of the inter-base station communication unit 23.

Although an example in which the wireless signal processing unit 21 is configured as a single IC is illustrated in FIG. 5, the IC configuration of the present technology is not limited thereto. For example, the wireless interface unit may be provided as a separate IC.

<Configuration Example of Communication Terminal>

Figure 6:
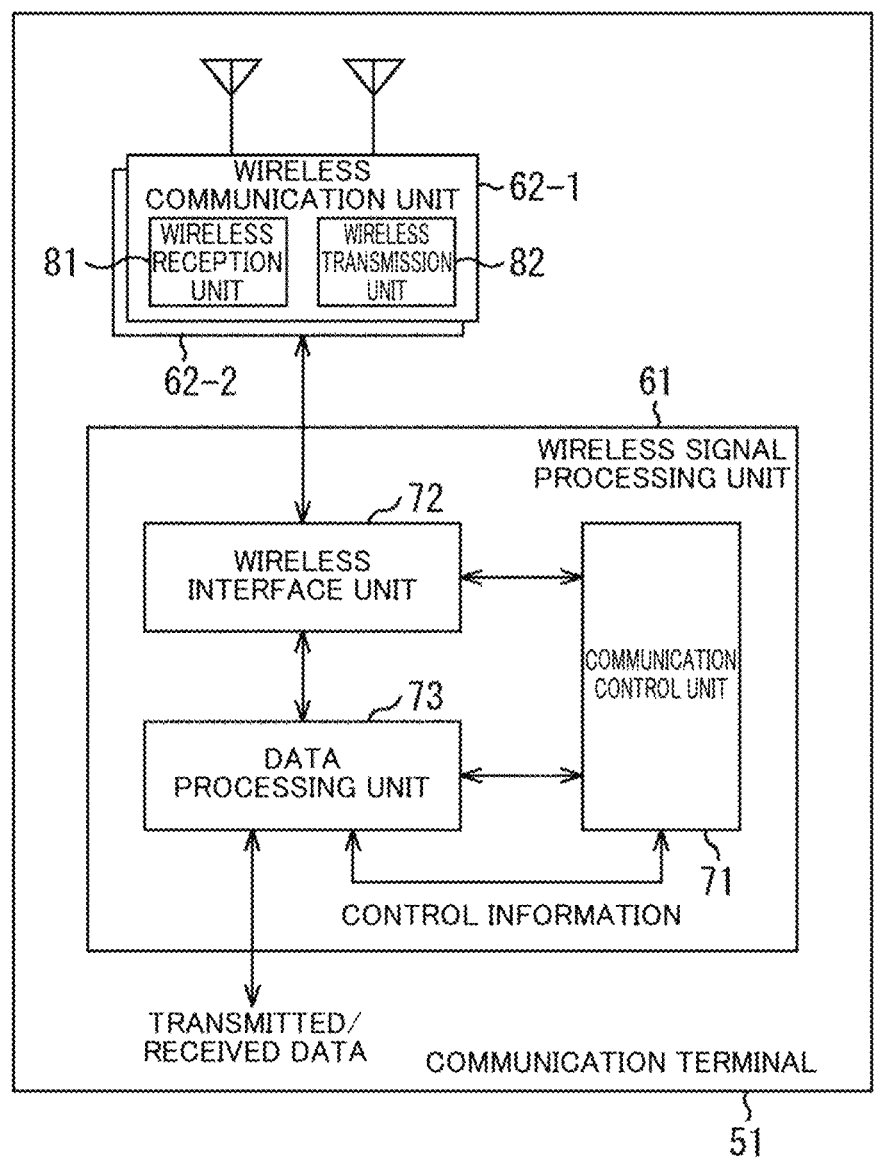
FIG. 6 is a block diagram illustrating a configuration example of a communication terminal.

FIG. 6 is a block diagram illustrating a configuration example of a communication terminal.

A communication terminal 51 illustrated in FIG. 6 is a device operating as an STA.

The communication terminal 51 includes a wireless signal processing unit 61 and wireless communication units 62-1 and 62-2.

The wireless signal processing unit 61 controls communication with APs and communication with STAs.

The wireless signal processing unit 61 includes a communication control unit 71, a wireless interface unit 72, and a data processing unit 73.

The communication control unit 71 includes a CPU, a ROM, and a RAM. The communication control unit 71 executes a program stored in the ROM or the like to control the overall operation of the communication terminal 51. The communication control unit 71 controls the wireless communication units 62-1 and 62-2 through the wireless interface unit 72 and sets communication resources and the like. Further, the communication control unit 71 performs processing of transferring control information to be notified to an AP and other STAs to the data processing unit 73.

For example, the communication control unit 71 generates a short feedback response including the second measurement result of an NDP by measuring the NDP in response to a short feedback request acquired from the AP and transfers the short feedback response to the data processing unit 73. The communication control unit 71 generates transmission weight information that is the first measurement result of the NDP by measuring the NDP and transfers the transmission weight information to the data processing unit 73.

The wireless interface unit 72 performs analog conversion on a transmission signal generated by the data processing unit 33 to convert the transmission signal from a digital signal into an analog signal. Further, the wireless interface unit 72 performs digital conversion on received signals acquired through the wireless communication units 62-1 and 62-2 to convert the received signals from analog signals into digital signals.

The data processing unit 73 generates a transmission signal on the basis of transmission data and the control information received from the communication control unit 31 and outputs the generated transmission signal to the wireless interface unit 72.

The data processing unit 73 performs processing of demodulating the received signals received from the wireless interface unit 72 to extract received data and control information. The data processing unit 73 outputs the extracted control information to the communication control unit 71 and outputs the extracted received data to a higher layer that is not illustrated.

The wireless communication units 62-1 and 62-2 include antennas and perform wireless communication with APs on the basis of communication resources and the like set by the communication control unit 71. The wireless communication units 62-1 and 62-2 are referred to as a wireless communication unit 62 when they need not be particularly distinguished. The wireless communication units 62 are not limited to two wireless communication units and there being a plurality of (N>1) wireless communication units 62-1 to 62-n is included.

The wireless communication unit 62 includes a wireless reception unit 81 and a wireless transmission unit 82.

The wireless reception unit 81 performs RF processing and digital conversion on a wireless signal supplied from an antenna to generate a received signal. The wireless reception unit 81 outputs the generated received signal to the data processing unit 73 through the wireless interface unit 72.

The wireless transmission unit 82 performs analog conversion and RF processing on a transmission signal composed of packets generated by the data processing unit 73 to generate a wireless signal. The wireless transmission unit 82 outputs the generated wireless signal to an antenna.

Meanwhile, electromagnetic waves received through an antenna are output to the wireless reception unit 81 as a wireless signal. In addition, the antenna radiates a wireless signal generated by the wireless transmission unit 82 as electromagnetic waves.

Although an example in which the wireless signal processing unit 61 is configured as a single IC is illustrated in FIG. 6, the IC configuration of the present technology is not limited thereto. For example, the wireless interface unit may be provided as a separate IC.

3. FIRST EMBODIMENT (EXAMPLE OF TRANSMITTING ALL OF TRANSMISSION WEIGHT INFORMATION OF AP1/AP2 TO AP1)

First, an example in which AP1/AP2 simultaneously transmit an NDP-A frame and an NDP frame and all of transmission weight information of AP1/AP2 is transmitted to AP1 will be described as a first embodiment.

<Example of Overall Processing Sequence>

Figure 7:
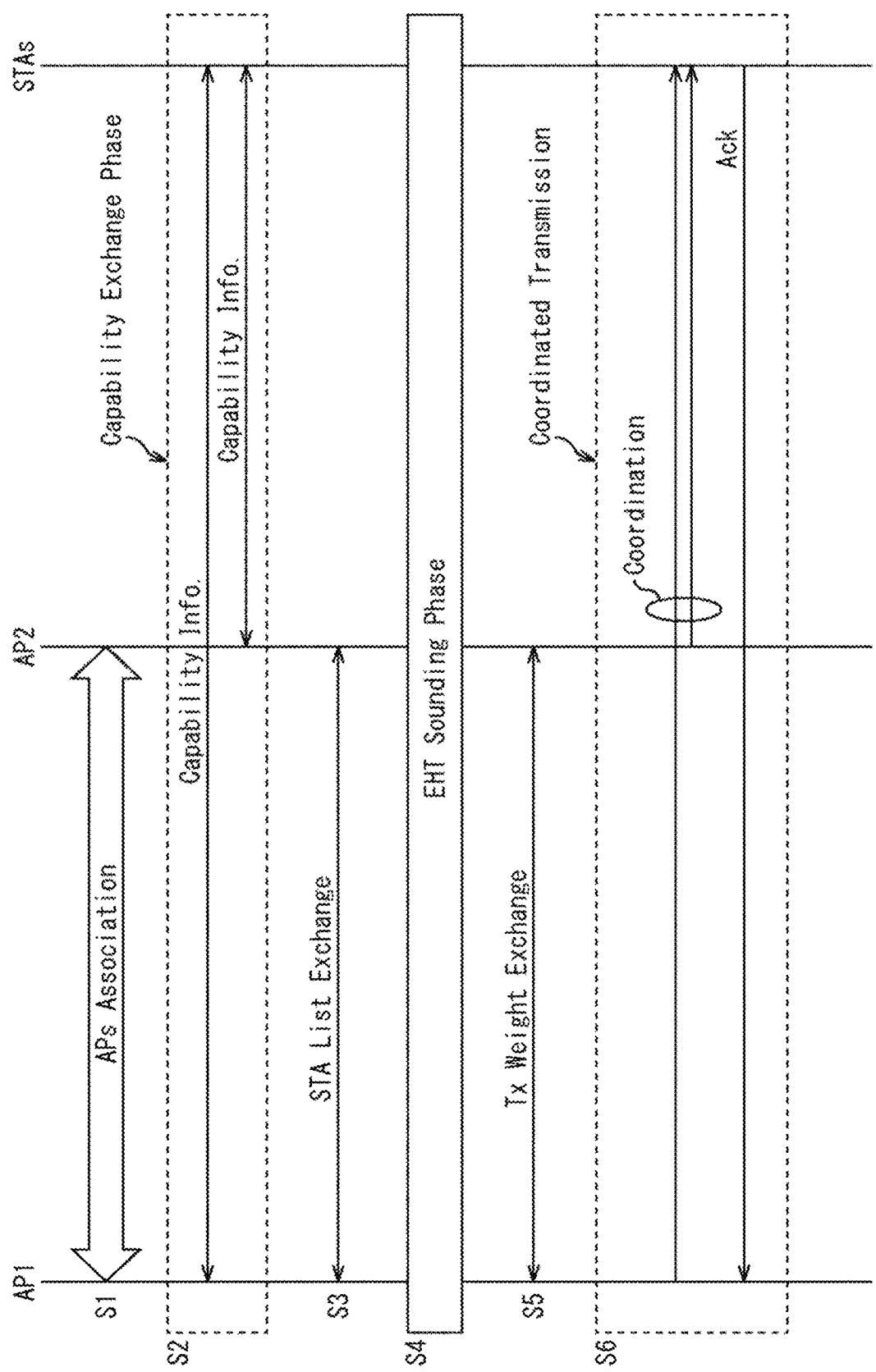
FIG. 7 is a diagram illustrating a sequence describing overall processing of a communication system.

FIG. 7 is a diagram illustrating a sequence describing overall processing of a communication system.

Step S1 is an APs association phase. In step S1, AP1 and AP2 establish connection between coordinated APs as APs association operation. Accordingly, connection relation between AP1 and AP2 is established. Establishment of connection may be performed in a wired or wireless manner. In the case of wireless connection, the association process standardized in IEEE 802.11 may be used as it is. Meanwhile, capability information about an AP coordinated operation may also be exchanged in this phase.

Step S2 is a capability exchange phase. In step S2, AP1 and AP2 perform exchange of capability information between APs and STAs as capability exchange operation. Here, AP1 and AP2 exchange capability information representing functions and capabilities with STAs subordinate thereto. In the case of the present technology, information representing whether short feedback information can be exchanged is included in the capability information.

Step S3 is an STA list exchange phase. In step S3, AP1 and AP2 perform exchange of information (addresses, AID information, and the like) about the STAs subordinate thereto (connected thereto) as STA list exchange operation. Accordingly, AP1, for example, can designate STA3 and STA4 other than a connection destination in the NDP-A frame and start the next sounding phase. In the case of the present technology, the capability information includes information representing whether short feedback information can be exchanged among information about STAs.

Step S4 is an enhanced high throughput (EHT) sounding phase. In step S4, AP1, AP2, and a plurality of STAs perform sounding processing on the assumption of a plurality of AP environments as an EHT sounding operation. In step S4, the plurality of STAs calculate transmission weights and transmission weight information representing the transmission weights is transmitted to AP1. Details of the EHT sounding phase will be described later.

Step S5 is a Tx weight exchange phase. In step S5, AP1 and AP2 perform exchange of a feedback signal acquired from each STA as Tx weight exchange operation. That is, the transmission weight information acquired in step S4 is exchanged between AP1 and AP2. For example, each STA feeds back transmission weight information to AP1 in the first embodiment, and thus AP1 needs to notify AP2 of transmission weight information of AP2 in step S5.

Step S6 is a coordinated transmission phase. In step S6, AP1 and AP2 perform coordinated transmission of data to the plurality of STAs on the basis of the transmission weight information and receive an ACK that is acknowledgment transmitted from the plurality of STAs. In step S6, coordinated transmission for mitigating interference applied to other STAs may be performed on the plurality of STAs or coordinated transmission for improving reception quality may be performed on a single STA.

Meanwhile, the order of phases may not particularly be the order shown in FIG. 7 and, for example, the APs association phase may be performed after the capability exchange phase. In addition, the respective phases need not necessarily be separate and, for example, the APs association phase and the STA list exchange phase may be simultaneously performed.

Furthermore, the frequency of each phase is not particularly limited and, for example, the STA list exchange phase may be regularly executed or performed when there is change (new connection or disconnection) of an STA subordinate to each AP.

<Configuration Example of Capability Exchange Frame>

Figure 8:
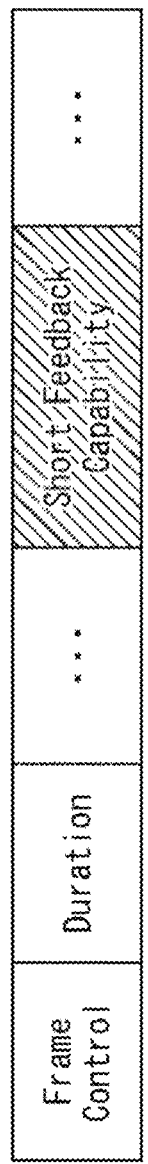
FIG. 8 is a diagram illustrating a configuration example of a capability exchange frame.

FIG. 8 is a diagram illustrating a configuration example of a capability exchange frame.

The capability exchange frame of FIG. 8 is exchanged in the capability exchange phase. The capability exchange frame includes frame control, duration, and short feedback capability fields, and the like. Meanwhile, hatching in FIG. 8 represents a field including information according to the present technology. The same applies the following figures.

The frame control field includes information representing that this frame includes capability information exchanged between APs.

The duration field includes information about the length of this frame.

The short feedback capability field includes short feedback capability information. The short feedback capability field is information representing whether an AP and an STA can transmit and receive a short feedback request frame and a short feedback response frame.

The short feedback request frame is not transmitted to an STA for which the short feedback capability field is "No" and optimization of communication resources of a feedback signal, and the like is not performed. Meanwhile, this capability information may include information representing whether a short feedback request frame and a short feedback response frame can be transmitted and received for each of designated measurement conditions (e.g., a reception power or a channel correlation value) which will be described later.

<Configuration Example of STA List Exchange Frame>

Figure 9:
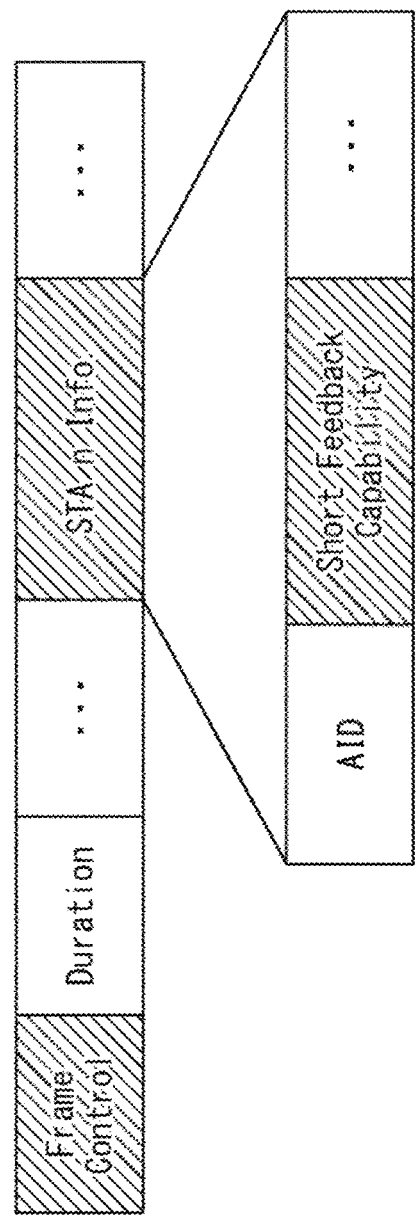
FIG. 9 is a diagram illustrating a configuration example of an STA list exchange frame.

FIG. 9 is a diagram illustrating a configuration example of an STA list exchange frame.

The STA list exchange frame in FIG. 9 is exchanged in the STA list exchange phase. The STA list exchange frame includes frame control, duration, and STA n info fields, and the like.

The frame control field includes information representing that this frame includes capability information exchanged between APs.

The duration field includes information about the length of this frame.

The STA n info field includes various types of information about an STA connected to a corresponding AP. The STA n info field may include, for example, AID information and short feedback capability information.

The AID information is information representing a destination of an STA. Meanwhile, information representing a destination is not limited to AID information and may be ID information of an STA, a MAC address, or a special identification number set only between an AP and an STA.

The short feedback capability information represents short feedback capability information of each STA collected in the capability exchange phase.

Further, the STA n info filed may include other information about the STA or may include, for example, information about the number of transmission antennas and a transmittable band.

<Example of Sequence of EHT Sounding Phase>

Figure 10:
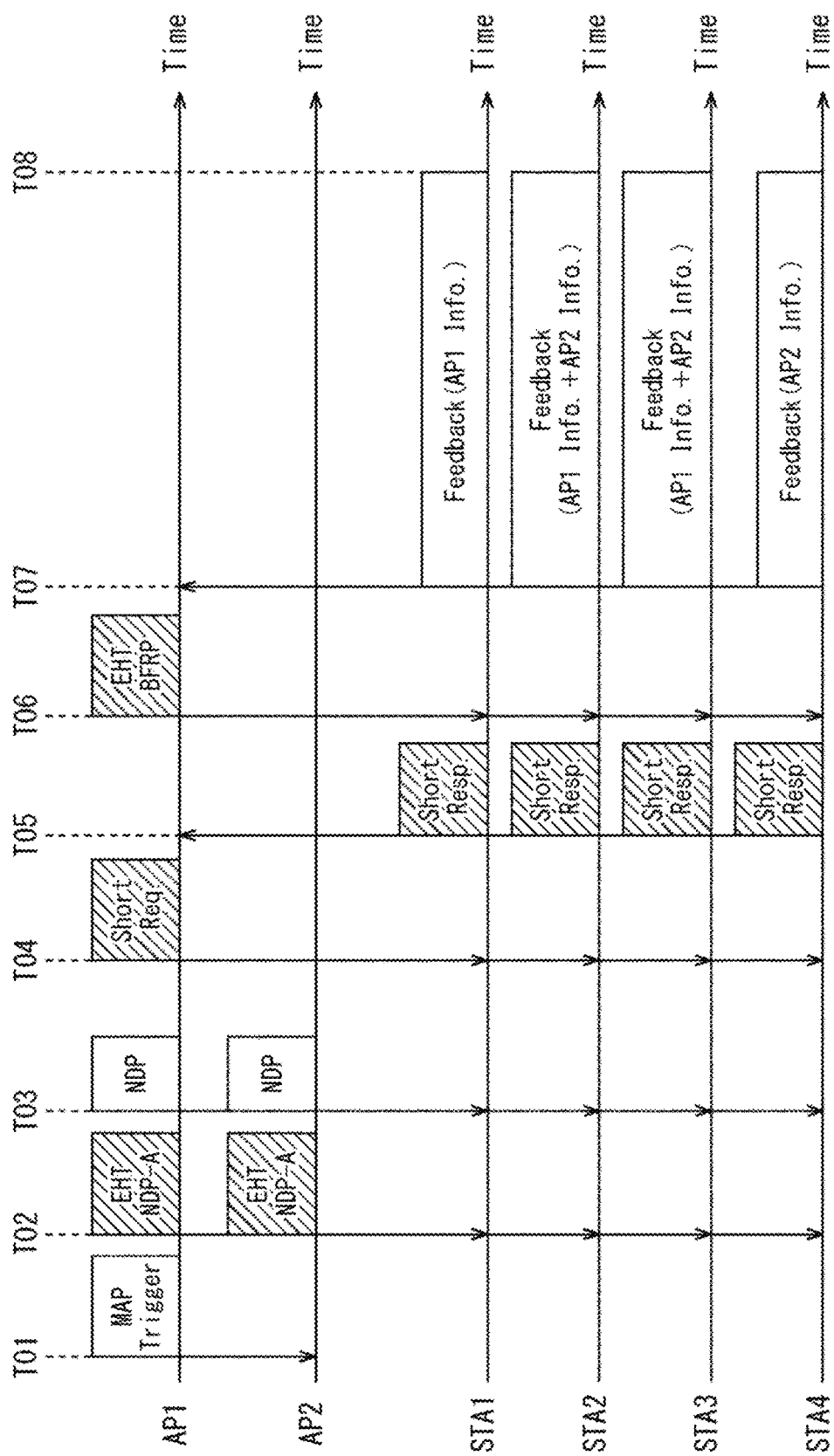
FIG. 10 is a diagram illustrating an example of a sequence of EHT sounding of a first embodiment of the present technology.

FIG. 10 is a diagram illustrating an example of a sequence of an EHT sounding phase of the present technology.

FIG. 10 illustrates an example in which AP1 and AP2 simultaneously transmit NDP frames and then AP1 transmits a short feedback request frame (Short Req. in FIG. 10) to all of STA1 to STA4.

At time T01, AP1 transmits a MAP trigger that is a coordination request signal for requesting coordinated transmission to AP2. Information indicating a determination method and a determination threshold value for obtaining measurement result information about an NDP measurement result included in the short feedback request frame to AP2 is written in the MAP trigger.

AP2 generates an EHT NDP-A frame and an NDP frame on the basis of the content written in the MAP trigger. The EHT NDP-A frame is an advance notification signal for notifying of transmission of the NDP frame in advance.

At time T02, AP1 and AP2 transmits EHT NDP-A frames. AP1 and AP2 simultaneously transmit the same NDP-A frames to allow each STA to receive them.

At time T03, AP1 and AP2 transmit NDP frames in a known pattern. The NDP frame changes an encoding pattern of an LTF in a preamble for each transmission antenna of AP1/AP2.

Accordingly, each STA can separate signals transmitted through transmission antennas of the APs and estimate a channel state. Meanwhile, the encoding pattern of the LTF may be an encoding pattern determined in existing standards (e.g., HE-LTF) or an encoding pattern newly determined (e.g., EHT-LTF).

At time T04, AP1 transmits a short feedback request frame to STA1 to STA4.

At time T05, STA1 to STA4 receive the short feedback request frame from AP1 and then transmit short feedback response frames (Short Resp. in FIG. 10) including second measurement results on the basis of a reception state of the NDP frames transmitted from AP1 and AP2. The second measurement result has a smaller amount of information and a smaller amount of calculations than those of transmission weight information that is the first measurement result.

AP1 performs optimization of the amount of information, communication resources, and the like of feedback signals as information about the feedback signals on the basis of information of the second measurement results of the short feedback response frames acquired from STA1 to STA4.

For example, AP1 requests second measurement results representing whether NDP frame reception power differences between connection destination APs of STA1 to STA4 and APs other than the connection destination APs are less than a threshold value from STA1 to STA4 by transmitting the short feedback request frame. AP1 acquires the requested second measurement results through the short feedback response frames transmitted from STA1 to STA4.

In this case, AP1 determines that effects according to coordinated communication of AP1 and AP2 can be obtained because STA2 and STA3 are close to both APs and do not have a reception power difference therebetween, as illustrated in FIG. 4. On the other hand, STA1 and STA4 are far away from APs other than connection destinations thereof and have a large reception power difference therebetween, and thus it is determined that a large effect would not be able to be obtained if AP1 and AP2 performed coordinated transmission.

At time T06, AP1 generates an EHT BFRP trigger frame on the basis of the aforementioned determination result and transmits the EHT BFRP trigger frame to STA1 to STA4. AP1 triggers transmission of feedback signals from STA1 to STA4 by transmitting the EHT BFRP trigger frame to STA1 to STA4. The EHT BFRP trigger frame is a trigger signal for triggering transmission of feedback signals including transmission weight information that is the first measurement result from STA1 to STA4.

In that case, AP1 designates, in the EHT BFRP trigger frame, more communication resources for STA2 and STA3 that feedback transmission weight information for both APs than communication resources for STA1 and STA4 that feedback only transmission weight information for the connection destination APs.

At time T07, STA1 transmits a feedback signal including transmission weight information for AP1 on the basis of the EHT BFRP trigger frame. STA2 and STA3 transmit feedback signals including transmission weight information for AP1 and transmission weight information for AP2 on the basis of the EHT BFRP trigger frame. STA4 transmits a feedback signal including transmission weight information for AP2 on the basis of the EHT BFRP trigger frame.

As described above, AP1 can detect a reception state of each STA, determine whether effects according to coordinated communication are obtained, and control the amount of information and communication resources of the feedback signal of each STA by transmitting the EHT BFRP trigger frame.

Effects of First Embodiment

Figure 11:
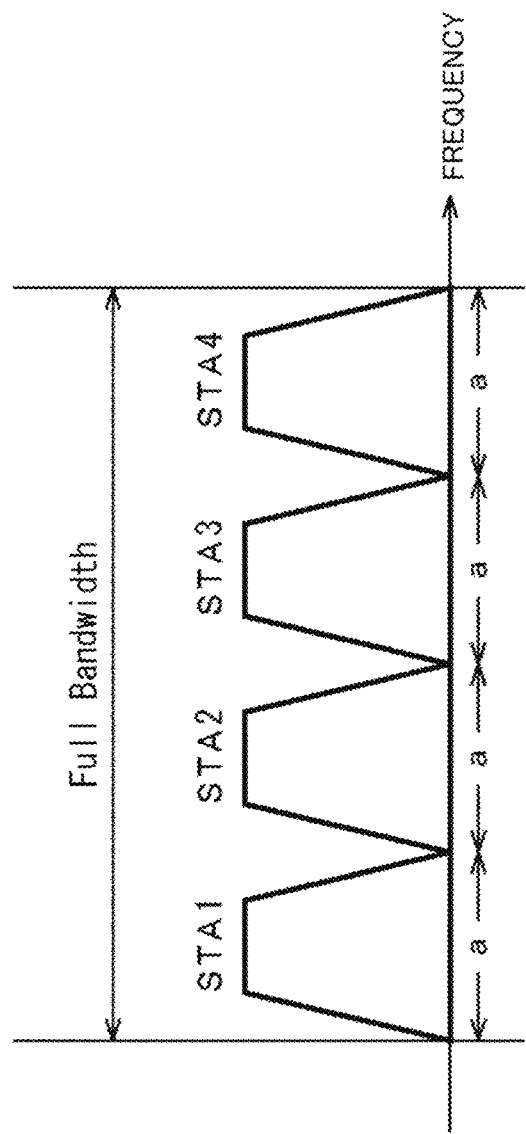
FIG. 11 is a diagram illustrating an example of a situation in which conventional communication resources are used.
Figure 12:
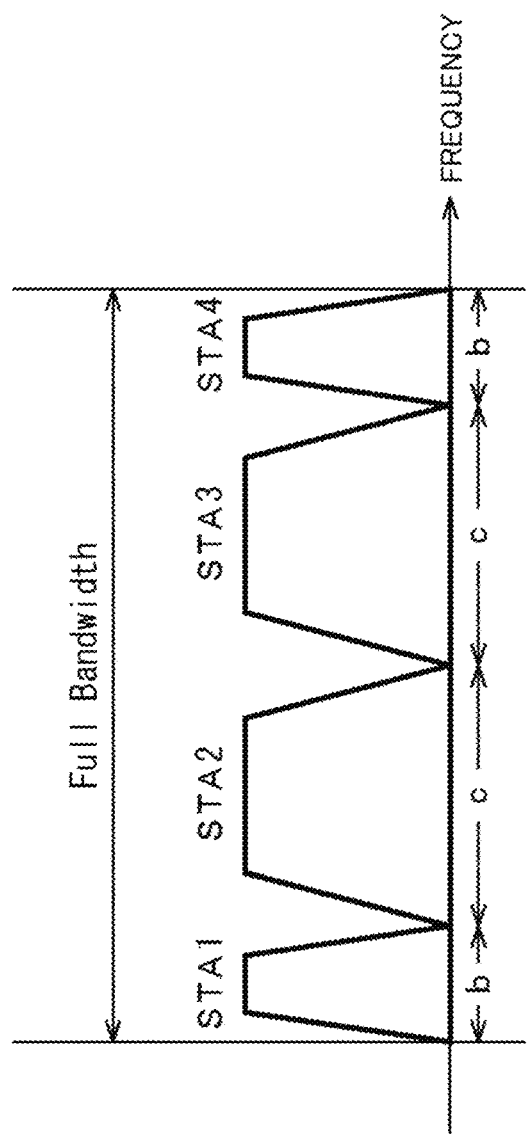
FIG. 12 is a diagram illustrating an example of a situation in which communication resources of the present technology are used.

FIG. 11 is a diagram illustrating an example of a situation in which conventional communication resources are used for comparison with a situation in which communication resources of the present technology are used. FIG. 12 is a diagram illustrating an example of a situation in which communication resources of the present technology are used.

In FIG. 11 and FIG. 12, communication resources for each STA in frequency bands to be used are illustrated.

In a conventional communication system, STA1 to STA4 use communication resources of frequency bands equally, for example, by a bandwidth a, as illustrated in FIG. 11. On the other hand, in the communication system of the present technology, STA1 and STA4 far away from APs other than connection destinations transmit only transmission weight information for the connection destination APs.

Accordingly, only transmission weight information for AP1 or AP2 is transmitted through communication resources of frequency bands used by STA1 and STA4, as illustrated in FIG. 12, and thus a narrower bandwidth b (b<a) than the bandwidth a in FIG. 11 is designated therefor. On the other hand, transmission weight information for AP1 and transmission weight information for AP2 are transmitted through communication resources of frequency bands used by STA2 and STA3, as illustrated in FIG. 12, and thus a wider bandwidth c (a<c) than the bandwidth a in FIG. 11 is designated therefor.

Accordingly, it is possible to reduce a time taken to transmit feedback signals as a whole.

<Example of Format of EHT NDP-A Frame>

Figure 13:
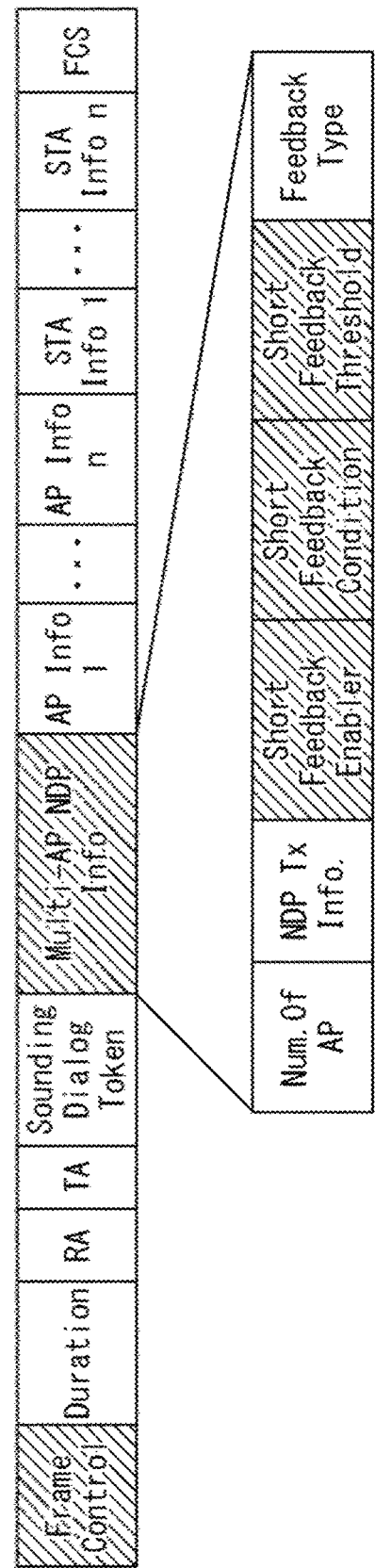
FIG. 13 is a diagram illustrating an example of a format of an EHT NDP-A frame.

FIG. 13 is a diagram illustrating an example of a format of the EHT NDP-A frame.

The EHT NDP-A frame includes Frame Control, Duration, RA, TA, Sounding Dialog Token, Multi-AP NDP Info, AP Info 1 to AP Info n, STA Info 1 to STA Info n, and FCS fields.

The Frame Control field includes information representing that this frame is the EHT NDP-A frame.

The Duration field includes information about the length of this frame.

The RA field includes reception destination address information. The TA field includes transmission destination address information.

The Sounding dialog token field includes NDP information and an identification number of a series of processing.

The Multi-AP NDP Info field includes information such as an NDP transmission method when a plurality of APs transmit NDPs in a coordinated manner and perform channel estimation, information about short feedback, and feedback signal transmission method.

Specifically, the Multi-AP NDP Info field includes information such as Num. Of AP, NDP Tx Info, Short Feedback Enabler, Short Feedback Condition, Short Feedback Threshold, and Feedback Type.

Num. Of AP is information representing the number of coordinating APs.

NDP Tx Info is information such as an NDP transmission method (simultaneous or separate transmission method), a transmission stream ID, and a transmission time.

Short Feedback Enabler is information representing notification of whether short feedback is performed.

Short Feedback Condition is information representing measurement conditions that are criteria when short feedback is performed, for example, a reception power difference between APs, a correlation value of an estimated channel, and the like.

Short Feedback Threshold is information representing reference values for determining whether to return 1 through short feedback with respect to conditions designated in Short Feedback Condition. As reference values, an absolute threshold value and a relative value with respect to an NDP transmitted from an AP are designated. In addition, the threshold value itself may not be designated in this field and, for example, a threshold value calculation method such as a method of calculating a threshold value of an NDP reception power value transmitted from another AP on the basis of an NDP reception power value transmitted from the AP may be designated. Further, Short Feedback Threshold is information that is not necessary depending on the configuration of a response frame.

Feedback Type includes information representing designation of whether STAs return all measurement result information to the same AP (first embodiment) or return respective pieces of measurement result information to respective APs (second embodiment). Meanwhile, Feedback Type, the aforementioned Num. Of AP, Short Feedback Condition, and the like are unnecessary information when they are uniquely determined in standards.

AP Info includes information on APs that transmit NDP frames (e.g., AP identifiers, measurement bands, feedback information amounts) in a coordinated manner. Here, it is also conceivable that AP Info includes information on an AP that transmits a frame of the present technology. Further, the number of AP Info fields is designated in the aforementioned Num. Of AP.

STA Info includes information on STAs that receive and measure NDP frames (e.g., STA identifiers, measurement bands, feedback information amounts).

FCS includes error correction code.

For simultaneous transmission of the present frame between APs, it is necessary that AP1 should notify AP2 of the content of the present frame in advance, or AP1 should include necessary information in a MAP trigger and transmit the MAP trigger.

Meanwhile, Short Feedback Enabler/Short Feedback Condition/Short feedback Threshold may be included in AP Info. Furthermore, these three pieces of information may include, for example, a MAP trigger frame transmitted by AP1 and transmitted to each STA as an EHT NDP-A frame of AP2 as they are.

<Example of Format of Short Feedback Request Frame>

Figure 14:
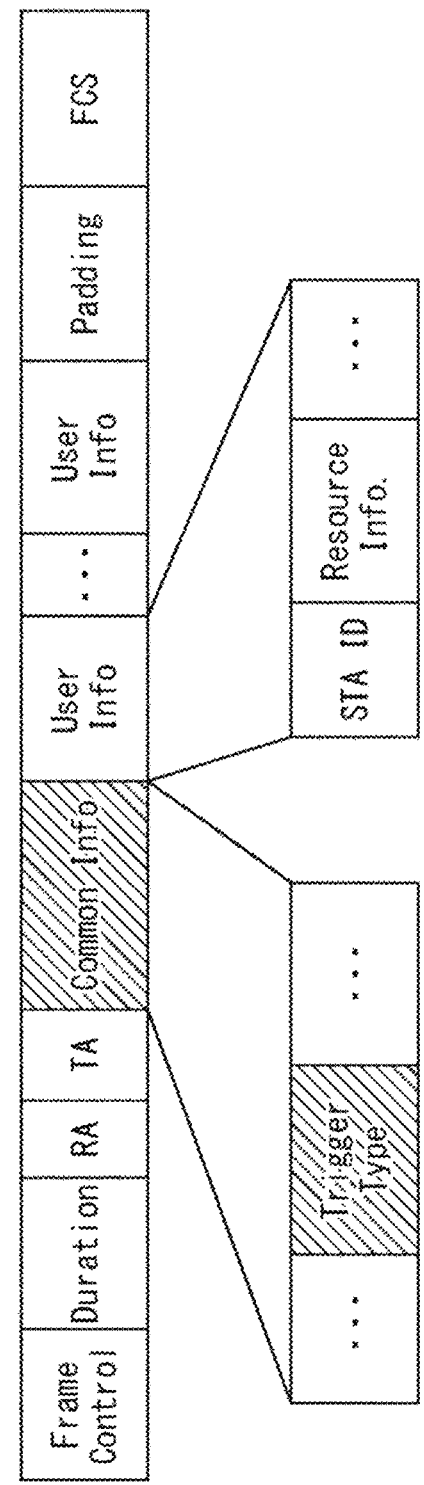
FIG. 14 is a diagram illustrating an example of a format of a short feedback request frame.

FIG. 14 is a diagram illustrating an example of a format of the short feedback request frame. Meanwhile, description of the same fields and configurations as those of the above-described other frame will be omitted. The same applies to the following figures.

The short feedback request frame includes Frame Control, Duration, RA, TA, Common Info, User Info, Padding, and FCS fields.

The Frame Control field includes information representing that this frame is the short feedback request frame.

The Common Info field includes information common for all STAs to which this frame will be transmitted. The present technology is characterized in that Trigger Type in Common Info represents that this frame is the short feedback request frame (this information is not necessary if Frame Control can designate the same).

User Info includes an identifier of an STA requested to response (STA ID), communication resources (Resource Info) of the short feedback response frame, and information necessary for transmission of another short feedback response frame.

<Example of Format of Short Feedback Response Frame>

Figure 15:
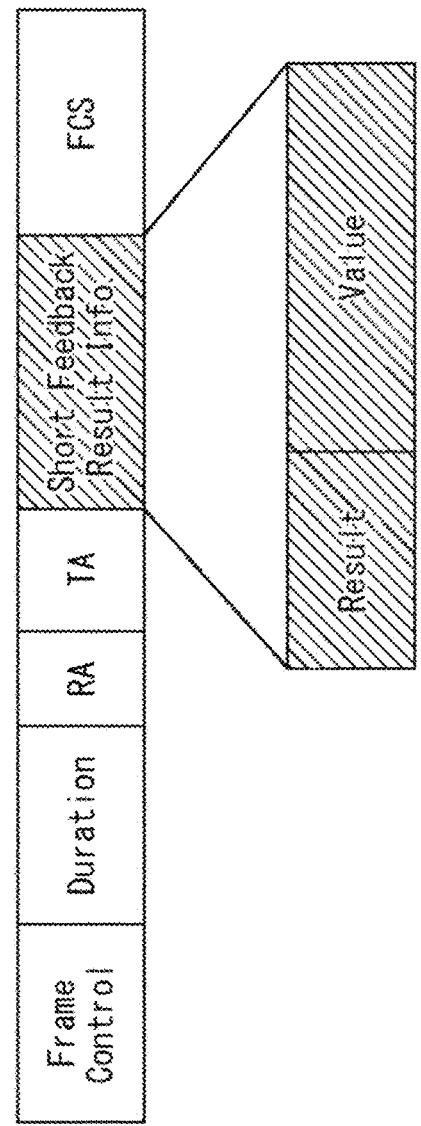
FIG. 15 is a diagram illustrating an example of a format of a short feedback response frame.

FIG. 15 is a diagram illustrating an example of a format of the short feedback response frame.

The short feedback response frame includes Frame Control, Duration, RA, TA, Short Feedback Result Info, and FCS fields.

The Frame Control field includes information representing that this frame is the short feedback response frame.

The Short Feedback Result Info field includes information representing whether a measurement result designated in "Short Feedback Condition" in an NDP-A frame exceeds "Short Feedback Threshold" (result) and a measurement value (value). Meanwhile, the Short Feedback Result Info field may include both the result and the value or only one thereof.

<Example of Format of EHT BFRP Trigger Frame>

Figure 16:
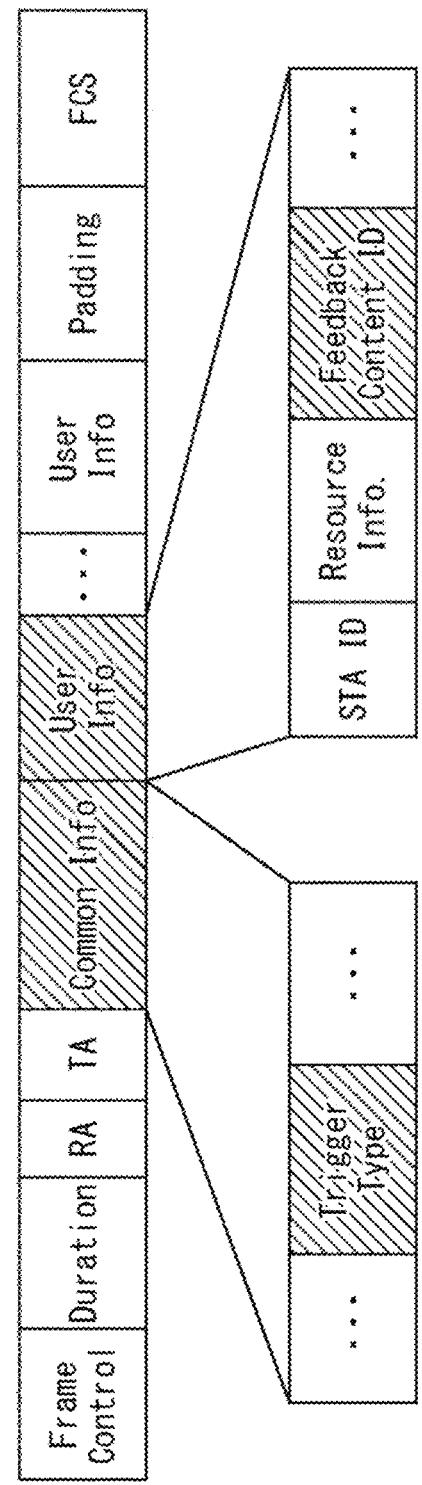
FIG. 16 is a diagram illustrating an example of a format of an EHT BFRP trigger frame.

FIG. 16 is a diagram illustrating an example of a format of the EHT BFRP trigger frame.

The EHT BFRP trigger frame includes Frame Control, Duration, RA, TA, Common Info, User Info, Padding, and FCS fields.

The Frame Control field includes information representing that this frame is the EHT BFRP trigger frame.

The Common Info field includes information common for all STAs to which this frame will be transmitted. The present technology is characterized in that Trigger Type in Common Info represents that this frame is the EHT BFRP trigger frame (this information is not necessary if Frame Control can designate the same).

User Info includes an identifier of an STA requested to response (STA ID), communication resources (Resource Info) of a feedback signal, content of feedback (Feedback Content ID), and information necessary for transmission of other feedback signals.

The content of feedback mentioned here means information representing whether a measurement result to be fed back includes only a result of a connection destination AP or also includes results from other APs.

<Operation of Device>

Figure 17:
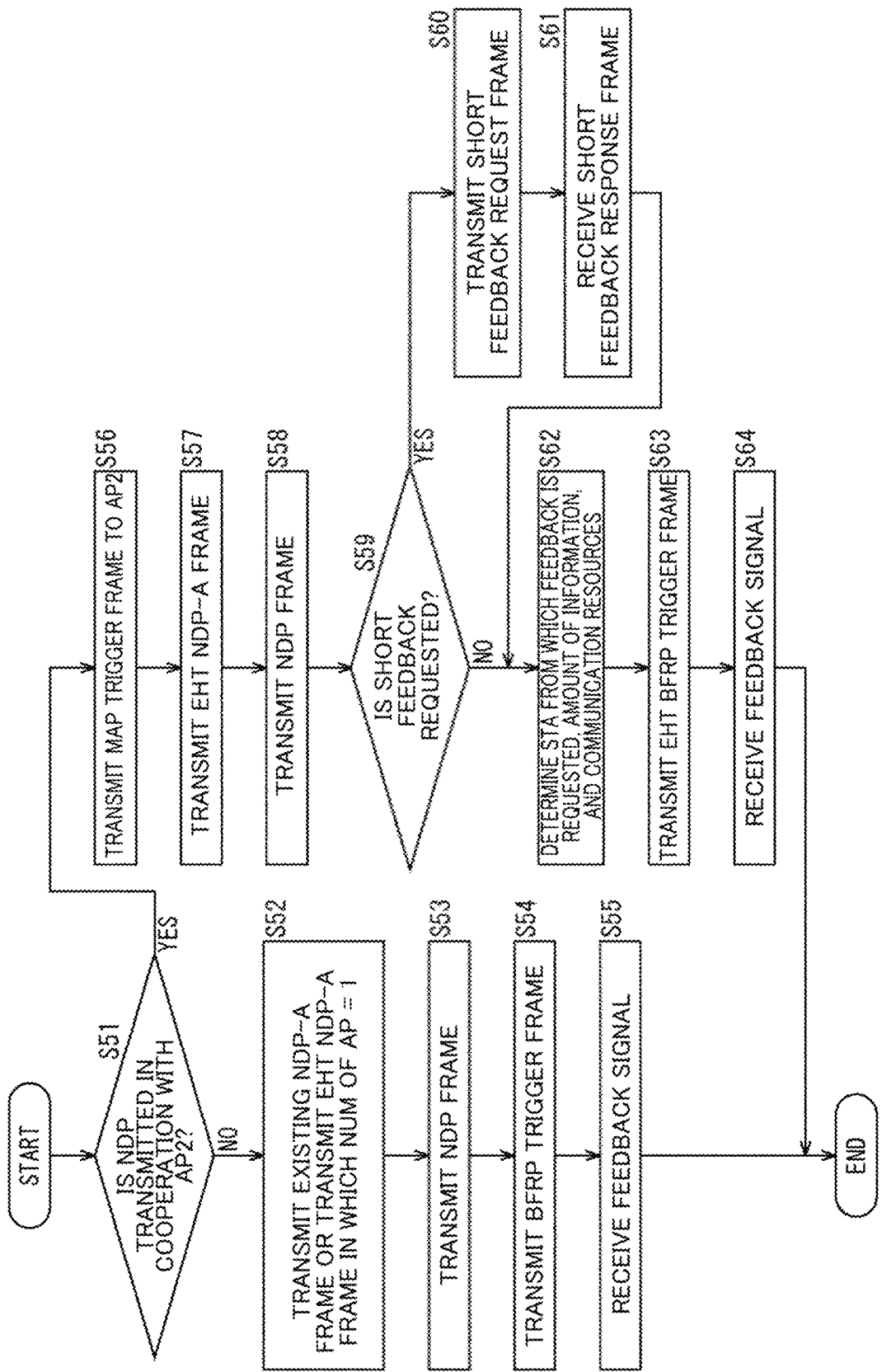
FIG. 17 is a flowchart describing EHT sounding processing of AP1.

FIG. 17 is a flowchart describing EHT sounding processing of a wireless communication device 11-1 operating as AP1.

In step S51, the communication control unit 31 of the wireless communication device 11-1 determines whether to transmit an NDP in cooperation with AP2. If it is determined that the NDP is not transmitted in cooperation with AP2 in step S51, processing proceeds to step S52.

In step S52, the communication control unit 31 transmits the existing NDP-A frame or generates an EHT NDP-A frame (FIG. 13) in which Num Of AP=1 and causes the wireless transmission unit 41 to transmit the EHT NDP-A frame.

In step S53, the communication control unit 31 generates an NDP frame and causes the wireless transmission unit 41 to transmit the NDP frame.

In step S54, the communication control unit 31 generates a BFRP trigger frame and causes the wireless transmission unit 41 to transmit the BFRP trigger frame. Meanwhile, if there is a single STA, transmission of the BFRP trigger frame is unnecessary.

An STA that has received the BFRP trigger frame and determined that a feedback signal needs to be transmitted on the basis of the BFRP trigger frame transmits the feedback signal. In step S55, the wireless reception unit 42 receives the feedback signal.

On the other hand, if it is determined that an NDP frame is transmitted in cooperation with AP2 in step S51, processing proceeds to step S56.

In step S56, the communication control unit 31 generates a MAP trigger frame addressed to AP2 and causes the inter-base station communication unit 23 to transmit the MAP trigger frame. Accordingly, EHT sounding processing is started. Meanwhile, determination of starting of EHT sounding processing by AP1 is not particularly limited in the present technology and, for example, the determination may be fixed to the device or may be performed by an AP that has acquired a right to transmit.

In step S57, the communication control unit 31 generates an EHT NDP-A frame (FIG. 13) and causes the wireless transmission unit 41 to transmit the EHT NDP-A frame. It is conceivable that the EHT NDP-A frame include not only information on STAs subordinate to AP1 but also information on STAs subordinate to AP2. It is assumed that information on STAs subordinate to each AP is exchanged in advance through the STA list exchange frame of FIG. 9.

In step S58, the communication control unit 31 generates an NDP frame and causes the wireless transmission unit 41 to transmit the NDP frame.

In step S59, the communication control unit 31 determines whether to request short feedback. If it is determined that short feedback is requested in step S59, processing proceeds to step S60.

In step S60, the communication control unit 31 generates a short feedback request frame (FIG. 14) for all STAs to which the NDP frame has been transmitted and causes the wireless transmission unit 41 to transmit the short feedback request frame.

STAs that have received the short feedback request frame transmit short feedback response frames (FIG. 15) (step S156 of FIG. 19 which will be described later). Here, the STAs can transmit the short feedback response frames through a UL MU-MIMO technology (UL OFDMA or the like) by using the configuration of the trigger frame defined in 802.11ax.

Meanwhile, the short feedback response frames according to the UL MU-MIMO technology may be acquired from all STAs multiple times. In this case, the AP transmits the short feedback request frame multiple times.

In step S61, the wireless reception unit 42 receives the short feedback response frames. When the short feedback response frames are received, processing proceeds to step S62.

In addition, if it is determined that short feedback is not requested in step S59, processing proceeds to step S62.

In step S62, the communication control unit 31 determines an STA from which feedback is requested, the amount of information and communication resources of a feedback signal on the basis of information that can be acquired from the short feedback response frames.

In step S63, the communication control unit 31 generates an EHT BFRP trigger frame including the information determined in step S62 and causes the wireless transmission unit 41 to transmit the generated EHT BFRP trigger frame (FIG. 16).

The STA that has received the EHT BFRP trigger frame and determined that a feedback signal needs to be transmitted on the basis of the EHT BFRP trigger frame transmits the feedback signal (step S159 of FIG. 19 which will be described later). In step S64, the wireless reception unit 42 receives the feedback signal.

When the feedback signal is received in step S55 or S64, EHT sounding processing of AP1 ends.

Although it is assumed that communication resources of STAs are determined on the basis of acquired short feedback response frames in the first embodiment, AP1 may receive feedback signals from the STAs multiple times, for example, by transmitting the EHT BFRP trigger frame multiple times. AP1 may calculate and obtain information combined or designated by the STAs each time from the aforementioned short feedback response frames.

Figure 18:
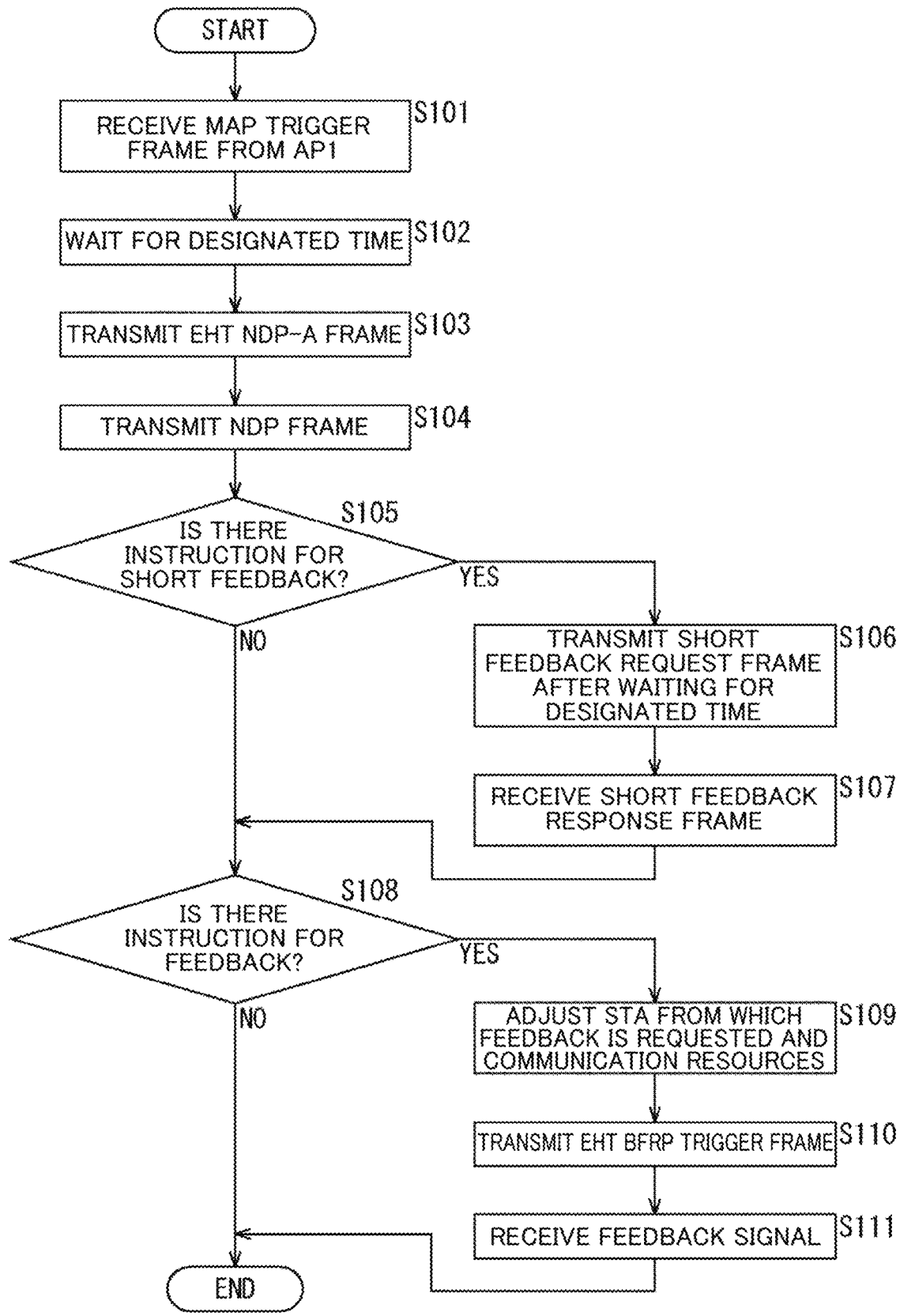
FIG. 18 is a flowchart describing EHT sounding processing of AP2.

FIG. 18 is a flowchart describing EHT sounding processing of a wireless communication device 11-2 operating as AP2.

In step S101, the inter-base station communication unit 23 of the wireless communication device 11-2 receives a MAP trigger frame transmitted from AP1.

In step S102, the communication control unit 31 waits for a designated time written in the MAP trigger frame.

In step S103, the communication control unit 31 generates an EHT NDP-A frame (FIG. 13) and causes the wireless transmission unit 41 to transmit the EHT NDP-A frame.

In step S104, the communication control unit 31 generates an NDP frame and causes the wireless transmission unit 41 to transmit the NDP frame.

In step S105, the communication control unit 31 determines whether the MAP trigger frame includes instruction for short feedback from AP1. If it is determined that the MAP trigger frame includes the instruction for short feedback in step S105, processing proceeds to step S106.

In step S106, the communication control unit 31 generates a short feedback request frame (FIG. 14), waits for a designated time, and then causes the wireless transmission unit 41 to transmit the short feedback request frame (FIG. 14).

STAs that have received the short feedback request frame transmit short feedback response frames (FIG. 15) (step S156 of FIG. 19 which will be described later). In step S107, the wireless reception unit 42 receives the short feedback response frames. After reception of the short feedback response frames, processing proceeds to step S108.

If it is determined that the MAP trigger frame does not include the instruction for short feedback in step S105, processing proceeds to step S108.

In step S108, the communication control unit 31 determines whether the MAP trigger frame includes instruction for feedback from AP1. If it is determined that the MAP trigger frame includes the instruction for feedback, processing proceeds to step S109.

In step S109, the communication control unit 31 determines an STA from which feedback is requested, the amount of information and communication resources of a feedback signal.

In step S110, the communication control unit 31 generates an EHT BFRP trigger frame on the basis of the information determined in step S109 and causes the wireless transmission unit 41 to transmit the generated EHT BFRP trigger frame (FIG. 16). Meanwhile, AP2 may start transmission of the EHT BFRP trigger frame after waiting for a fixed time (SIFS or the like) in which reception of a feedback signal by AP2 is completed.

However, if a time when reception of a feedback signal by AP1 is completed is not ascertained due to change or the like, AP2 may receive the MAP trigger frame or a similar frame again from AP1 and start transmission of the EHT BFRP trigger frame.

The STA that has received the EHT BFRP trigger frame and determined that a feedback signal needs to be transmitted on the basis of the EHT BFRP trigger frame transmits the feedback signal (step S159 of FIG. 19 which will be described later). In step S111, the wireless reception unit 42 receives the feedback signal.

When the feedback signal is received in step S111, EHT sounding processing of AP1 ends.

Processing of AP2 in FIG. 18 differs from processing of AP1 in FIG. 17 in that AP2 determines whether to transmit the short feedback request frame or the EHT BFRP trigger frame on the basis of information (NDP Tx Info, Feedback Type, and the like) included in the MAP trigger transmitted from AP1.

Further, since processing of FIG. 18 is an example in which AP1 acquires a transmission right in advance and starts coordinated operation, AP2 performs processing of FIG. 17 if AP2 is in a situation in which it can start the coordinated operation.

In addition, if three or more APs, for example, AP3, AP4, and the like are present in the communication system, processing of AP3 and AP4 is assumed to be the same as processing of AP2 described above with reference to FIG. 18.

Figure 19:
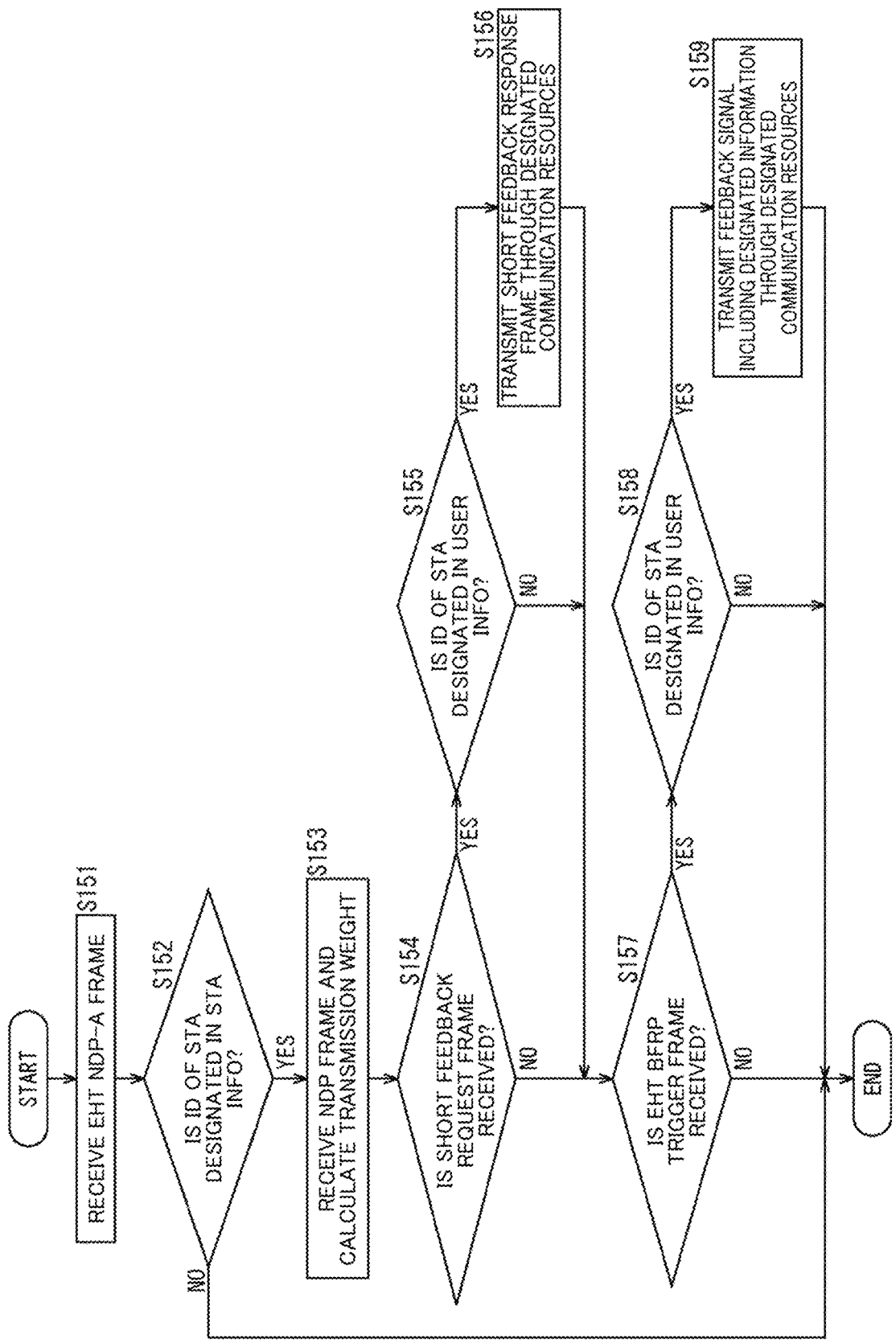
FIG. 19 is a flowchart describing EHT sounding processing of an STA.

FIG. 19 is a flowchart describing EHT sounding processing of a wireless communication device 12 operating as an STA that is any of STA1 to STA4.

AP1 and AP2 transmit the EHT NDP-A frame (FIG. 13) in step S52 and step S57 of FIG. 17 and step S103 of FIG. 18.

In step S151, the wireless reception unit 81 of the STA receives the EHT NDP-A frame.

In step S152, the communication control unit 71 determines whether the ID of the STA is designated in STA Info of the EHT NDP-A frame. If it is determined that the ID of the STA is designated in STA Info of the EHT NDP-A frame in step S152, processing proceeds to step S153.

AP1 and AP2 transmit the NDP frame in step S53 and step S58 of FIG. 17 and step S104 of FIG. 18. In step S153, the communication control unit 71 receives the NDP frame, estimates a channel state on the basis of a reception state of the NDP frame, and calculates a transmission weight.

AP1 and AP2 transmit the short feedback request frame (FIG. 14) in step S60 of FIG. 17 and step S106 of FIG. 18 as necessary.

In step S154, the communication control unit 71 determines whether the short feedback request frame has been received. If it is determined that the short feedback request frame has been received in step S154, processing proceeds to step S155.

In step S155, the communication control unit 71 determines whether the ID of the STA is designated in User Info of the short feedback request frame. If it is determined that the ID of the STA is designated in User Info of the short feedback request frame in step S155, processing proceeds to step S156.

In step 156, the communication control unit 71 generates a short feedback response frame (FIG. 15) using communication resources designated in User Info of the short feedback request frame and causes the wireless transmission unit 82 to transmit the short feedback response frame. Meanwhile, it is desirable that information and a determination method included in the short feedback response frame be included in the EHT NDP-A frame received in step S151. However, they may be included in the short feedback request frame.

After transmission of the short feedback response frame, processing proceeds to step S157.

If it is determined that the short feedback request frame has not been received in step S154, processing also proceeds to step S157. In addition, if it is determined that the ID of the STA is not designated in User Info of the short feedback request frame in step S155, processing also proceeds to step S157.

In step S63 of FIG. 17, AP1 transmits the EHT BFRP trigger frame (FIG. 16).

In step S157, the communication control unit 71 determines whether the EHT BFRP trigger frame has been received. If it is determined that the EHT BFRP trigger frame has been received in step S157, processing proceeds to step S158.

In step S158, the communication control unit 71 determines whether the ID of the STA is designated in User Info of the EHT BFRP trigger frame. If it is determined that the ID of the STA is designated in User Info of the EHT BFRP trigger frame in step S158, processing proceeds to step S159.

In step S159, the communication control unit 71 generates a feedback signal including designated information using communication resources designated in User Info of the EHT BFRP trigger frame and causes the wireless transmission unit 82 to transmit the feedback signal. The designated information mentioned here represents information designated in "Feedback Content ID" written in FIG. 16 and means whether transmission weight information of any one of AP1 and AP2 or both thereof is included in the feedback signal in the first embodiment.

If it is determined that the EHT BFRP trigger frame has not been received in step S157 or if it is determined that the ID of the STA is not designated in User Info of the EHT BFRP trigger frame in step S158, EHT sounding processing of the STA ends.

Further, if it is determined that the ID of the STA is not designated in STA Info of the NDP-A frame in step S152, EHT sounding processing of the STA also ends.

Meanwhile, it is desirable that the STA store transmission weight information calculated and acquired for a certain period because the EHT BFRP trigger frame may be transmitted multiple times.

In addition, all of information representing whether the short feedback request frame is transmitted, information responding through the short feedback response frame, information representing whether a plurality of APs simultaneously transmit the NDP frame, and the like are included in the EHT NDP-A frame as in FIG. 13. Accordingly, the STA can perform preparation for performing EHT sounding processing in advance at a time when the EHT NDP-A frame is received.

4. SECOND EMBODIMENT (EXAMPLE OF TRANSMITTING TRANSMISSION WEIGHT INFORMATION AP1 TO AP1 AND TRANSMITTING TRANSMISSION WEIGHT INFORMATION OF AP2 TO AP2)

Next, an example in which AP1/AP2 simultaneously transmit an NDP-A frame and an NDP-frame, transmission weight information of AP1 is transmitted to AP1, and transmission weight information of AP2 is transmitted to AP2 will be described as a second embodiment.

Meanwhile, an overall sequence in the second embodiment is basically the same as that in the first embodiment and thus description thereof is omitted.

<Example of EHT Sounding Sequence>

Figure 20:
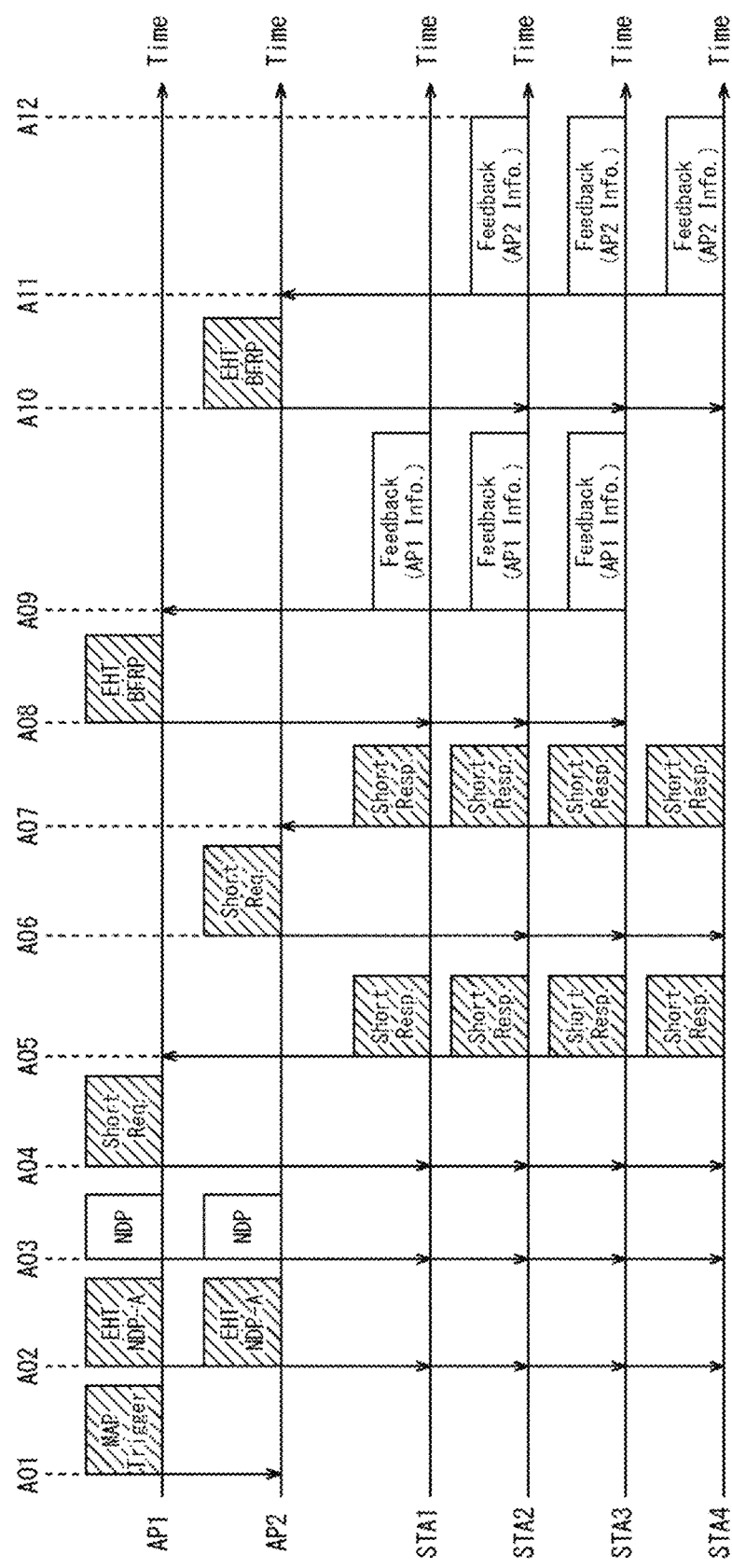
FIG. 20 is a diagram illustrating an example of a sequence of EHT sounding of a second embodiment of the present technology.

FIG. 20 is a diagram illustrating an example of an EHT sounding sequence of the present technology.

FIG. 20 illustrates an example in which AP1 and AP2 simultaneously transmit NDP frames and then AP1 and AP2 transmit short feedback request frames to all of STA1 to STA4. Meanwhile, details of processing are basically the same as those of FIG. 10 and thus are appropriately omitted.

At time A01, AP1 transmits a MAP trigger to AP2.

AP2 generates an EHT NDP-A frame and an NDP frame on the basis of content written in the MAP trigger.

At time A02, AP1 and AP2 transmits NDP-A frames. AP1 and AP2 simultaneously transmit the same NDP-A frames to cause each STA to receive them.

At time A03, AP1 and AP2 transmit NDP frames in a known pattern. The NDP frames change an encoding pattern of an HE-LTF in a preamble for each transmission antenna of AP1/AP2. Accordingly, each STA can separate signals transmitted through transmission antennas of the APs and estimate a channel state. Meanwhile, the encoding pattern of the LTF may be an encoding pattern determined in existing standards (e.g., HE-LTF) or an encoding pattern newly determined (e.g., EHT-LTF).

At time A04, AP1 transmits a short feedback request frame (FIG. 15) to STA1 to STA4.

At time A05, STA1 to STA4 generate short feedback response frames (FIG. 14) on the basis of a reception state of the NDP frame transmitted from AP1 and transmit the short feedback response frames to AP1 after receiving the short feedback request frame from AP1.

At time A06, AP2 transmits a short feedback request frame to STA1 to STA4.

At time A07, STA1 to STA4 generate short feedback response frames on the basis of a reception state of the NDP frame transmitted from AP2 and transmit the short feedback response frames to AP2 after receiving the short feedback request frame from AP2.

At time A08, AP1 performs optimization of the amount of information and communication resources of a feedback signal on the basis of information of the short feedback response frames acquired from STA1 to STA4. AP1 triggers transmission of feedback signals from STA1 to STA3 by transmitting the EHT BFRP trigger frame to STA1 to STA4.

At time A09, STA1 to STA3 transmit feedback signals including transmission weight information for AP1 to AP1 on the basis of the EHT BFRP trigger frame.

At time A10, AP2 performs optimization of the amount of information and communication resources of a feedback signal on the basis of information of the short feedback response frames acquired from STA1 to STA4. AP2 triggers transmission of feedback signals from STA2 to STA4 by transmitting an EHT BFRP trigger frame to STA2 to STA4. Meanwhile, AP2 may start transmission of the EHT BFRP trigger frame after waiting for a fixed time (SIFS or the like) in which reception of feedback signals by AP1 is completed. However, if a time when reception of feedback signals by AP1 ends is not ascertained due to change and the like, AP2 may receive the MAP trigger frame or a similar frame from AP1 again and start transmission of the EHT BFRP trigger frame.

At time A11, STA2 to STA4 transmit feedback signals including transmission weight information for AP2 to AP2 on the basis of the EHT BFRP trigger frame.

Meanwhile, frame configurations of the second embodiment can correspond to the frame configurations described in the first embodiment. For example, the operation of the second embodiment can be designated through "Feedback Type" of FIG. 13.

Effects of Second Embodiment

Figure 21:
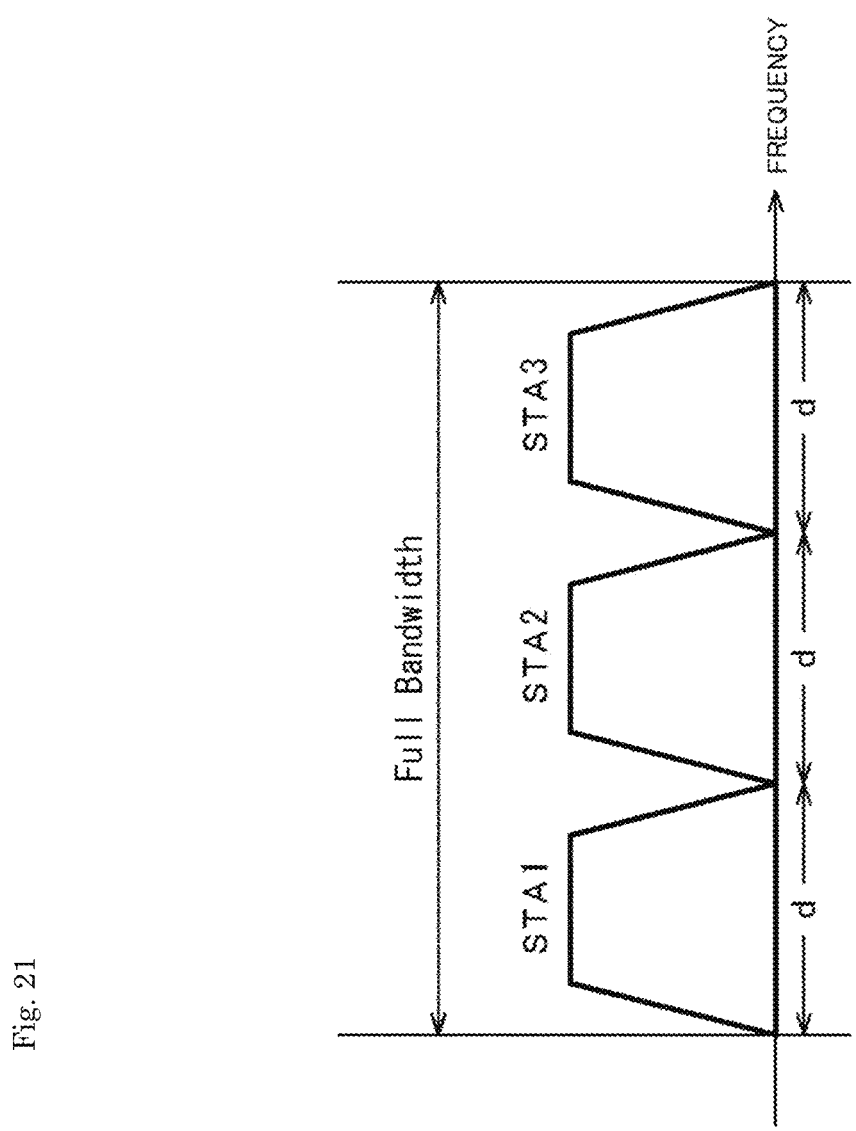
FIG. 21 is a diagram illustrating an example of a situation in which communication resources of the present technology are used.

FIG. 21 is a diagram illustrating an example of a situation in which communication resources of the present technology are used.

FIG. 21 illustrates communication resources for each STA in a frequency band to be used.

In a conventional communication system, STA1 to STA4 equally use communication resources of frequency bands, for example, by a bandwidth a, as illustrated in FIG. 11. On the other hand, in the communication system of the present technology, STA4 far away from AP1 does not transmit transmission weight information for AP1.

Accordingly, communication resources of frequency bands used by STA1 to STA3 are designated as a wider bandwidth d (a<d) than the bandwidth a in FIG. 11, as illustrated in FIG. 21.

In addition, STA1 far away from AP2 does not transmit transmission weight information for AP2.

Accordingly, communication resources of frequency bands used by STA2 to STA4 are designated as the wider bandwidth d (a<d) than the bandwidth a in FIG. 11, as in the example of FIG. 21.

Accordingly, it is possible to reduce a time taken to transmit feedback signals as a whole.

As described above, in the present technology, short feedback request information that is a second measurement result request signal and short feedback response information that is a second measurement result are exchanged between transmission of an NDP frame in a known pattern and reception of a feedback signal that is a first measurement result.

This makes it possible to optimally allocate feedback signal request destinations and communication resources of feedback signals after the information exchange.

FIG. 22 is a diagram illustrating features of the above-described first and second embodiments and third and fourth embodiments which will be described.

"Transmission weight information of AP1+AP2" in FIG. 22 means transmission weight information calculated on the assumption that NDP frames transmitted from AP1 and AP2 are signals transmitted from the same AP. In addition, "transmission weight information of AP1" means transmission weight information calculated from only an NDP frame transmitted from AP1.

As illustrated in FIG. 22, the content of a feedback signal in the first embodiment is transmission weight information of AP1+AP2 or transmission weight information of a connection destination AP. Which transmission weight information is transmitted is determined on the basis of exchange of a short feedback request/short feedback response (hereinafter referred to as Short Req./Resp.).

In addition, a transmission destination of a feedback signal in the first embodiment is either one of APs.

The content of a feedback signal in the second embodiment is transmission weight information of AP1+AP2 or transmission weight information of a connection destination AP. Which transmission weight information is transmitted is determined on the basis of exchange of Short Req./Resp.

In addition, a transmission destination of a feedback signal in the second embodiment is a connection destination AP.

The content of a feedback signal in the third embodiment is transmission weight information of AP1+AP2 or transmission weight information of AP1+transmission weight information of AP2. Which transmission weight information is transmitted is determined on the basis of exchange of Short Req./Resp.

In addition, a transmission destination of a feedback signal in the third embodiment is either one of APs.

The content of a feedback signal in the fourth embodiment is transmission weight information of AP1+AP2.

In addition, a transmission destination of a feedback signal in the fourth embodiment is a connection destination AP or another AP. Which transmission weight information is transmitted is determined on the basis of exchange of Short Req./Resp.

5. THIRD EMBODIMENT (EXAMPLE OF TRANSMITTING TRANSMISSION WEIGHT INFORMATION ON THE BASIS OF COORDINATION METHOD)

In the first embodiment, an example in which a feedback signal (transmission weight information of AP1+AP2 or transmission weight information of a connection destination AP) is transmitted, as described with reference to FIG. 22, has been described.

Next, an example in which a feedback signal (transmission weight information of AP1+AP2 or any one of transmission weight information of AP1 and transmission weight information of AP2) is transmitted is described in the third embodiment.

Whether the content of a feedback signal is transmission weight information of AP1+AP2 or transmission weight information of AP1+transmission weight information of AP2 depends on a coordination method performed by AP1 and AP2.

Figure 23:
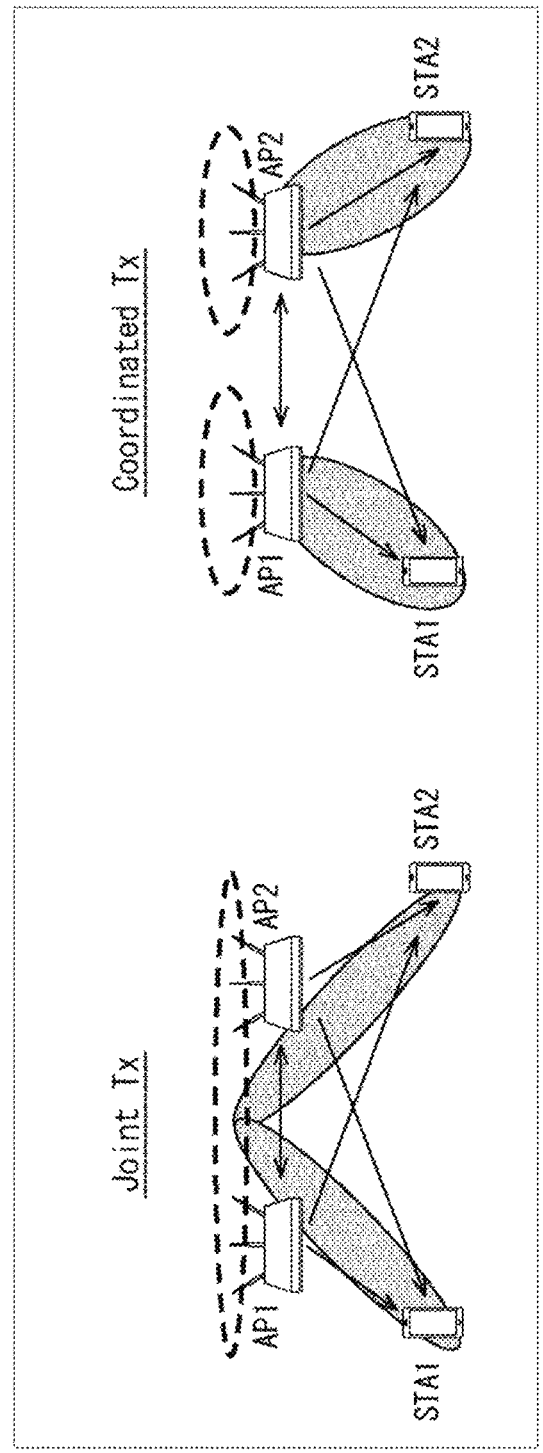
FIG. 23 is a diagram conceptually illustrating Joint Tx and Coordinated Tx.

FIG. 23 is a diagram schematically illustrating Joint Tx and Coordinated Tx that are two types of coordination methods.

In FIG. 23, Joint Tx (also referred to as JTX hereinafter) is illustrated on the left and Coordinated Tx (also referred to as CTX hereinafter) is illustrated on the right. Further, in FIG. 23, shaded ovals represent beamforming states of the coordination methods.

Joint Tx is a coordination method by which a plurality of APs share transmission antennas and perform beamforming such that interference applied to other terminals is curbed. JTX has problems that high-precision frequency and time synchronization between APs and data sharing between APs are required and transmission cannot be performed between APs with maximum transmission power because transmission weights need to be determined within a range of power that can be transmitted by each AP. However, JTX has a higher channel gain than that in a case in which JTX is not performed because a larger number of transmission antennas can be used according to coordination.

To perform JTX between APs, the APs need to simultaneously transmit NDP frames and receive feedback of transmission weight information of AP1+AP2 (AP1 Info+ AP2 Info) from an STA as in the first embodiment. For example, when AP1/AP2 include four transmission antennas and an STA includes two reception antennas, the STA feeds back transmission weight information composed of an 8×2 matrix.

CTX is a coordination method by which a single AP performs beamforming such that interference applied to other terminals is curbed. CTX may also be called coordinated BF, coordinated nulling, nulling, non-coherence joint transmission, and the like.

CTX does not require data sharing and high-precision frequency and time synchronization between APs and thus can be relatively easily executed as compared to JTX, whereas CTX has a low degree of freedom of beamforming due to limitation on the number of transmission antennas per AP1 and thus a channel gain may be easily restricted.

To perform CTX between APs, transmission weight information (AP1 Info and AP2 Info) of AP1/AP2 can also be used although transmission weight information fed back from an STA may be used as in a case in which JTX is performed between APs. In this case, the APs transmit NDP frames simultaneously or individually, and an STA respectively feeds back transmission weight information of AP1 (AP1 Info) and transmission weight information of AP2 (AP2 Info). For example, when AP1/AP2 include four transmission antennas and an STA includes two reception antennas, the STA feeds back two pieces of transmission weight information composed of a 4×2 matrix.

According to the feedback signal format defined in IEEE 802.11ax/compressed beamforming, the amount of information of a feedback signal for CTX is less than that for JTX in general even if the numbers of rows and columns of a matrix of weight information fed back are identical. Accordingly, an optimal format of a feedback signal from an STA depends on an AP coordinated method in terms of minimization of the amount of information of the feedback signal.

Therefore, in the third embodiment, an AP determines transmission through a coordination method other than JTX for an STA for which it is possible to determine that sufficient characteristics can be obtained even through CTX or an STA for which it is determined that JTX is difficult to perform on the basis of exchange of Short Req./Resp and requests a feedback signal (hereinafter, a feedback signal for CTX) in a format necessary to perform CTX. It is possible to reduce a time taken to transmit a feedback signal by requesting determination of an appropriate coordination method and an appropriate feedback signal format for each STA on the basis of exchange of short feedback request/ response, as described above.

Next, the third embodiment will be described.

An overall sequence in the third embodiment is basically the same as that in the first embodiment and thus description thereof is omitted.

<Example of EHT Sounding Sequence>

Figure 24:
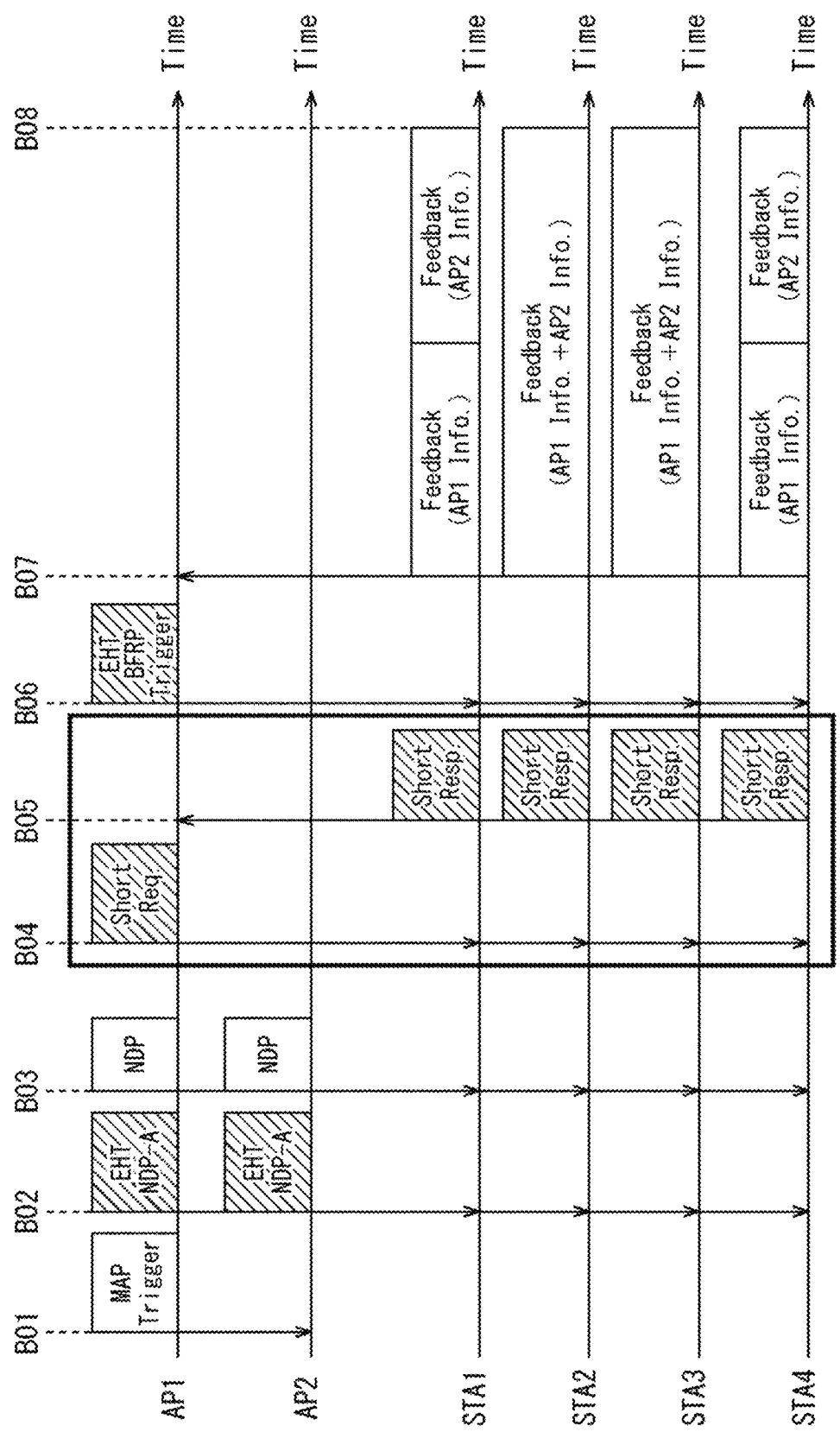
FIG. 24 is a diagram illustrating an example of a sequence of EHT sounding of a third embodiment of the present technology.

FIG. 24 is a diagram illustrating an example of an EHT sounding sequence of the present technology.

A sequence of time B01 to time B08 in FIG. 24 is the same as the sequence of time T01 to T08 in FIG. 10. However, FIG. 24 differs from FIG. 10 in that AP1 requests transmission weight information (feedback signals for JTX) of AP1+AP2 or requests transmission weight information of AP1 and transmission weight information of AP2 (feedback signals for CTX) from STAs using an EHT BFRP trigger at time B06. Details of processing are basically the same as those in FIG. 10 and thus description thereof will be appropriately omitted.

At time B01, AP1 transmits a MAP trigger to AP2. AP2 generates an EHT NDP-A frame and an NDP frame on the basis of the content written in the MAP trigger.

At time B02, AP1 and AP2 transmit EHT NDP-A frames.

At time B03, AP1 and AP2 transmit NDP frames.

At time B04, AP1 transmits a short feedback request frame to STA1 to STA4.

At time B05, STA1 to STA4 transmit short feedback response frames including second measurement result on the basis of a reception state of the NDP frames transmitted from AP1 and AP2 after receiving the short feedback request frame from AP1.

As described above, AP1 determines a coordination method for each STA on the basis of exchange of Short Req./Resp. such that feedback signals for CTX are received for an STA for which it is possible to determine that sufficient characteristics can be obtained even through CTX or an STA (STA1 and STA4 in the case of FIG. 24) for which it is possible to determine that JTX is difficult to perform.

At time B06, AP1 generates an EHT BFRP trigger frame on the basis of the aforementioned determination result and transmits the EHT BFRP trigger frame to STA1 to STA4.

In that case, AP1 designates a larger amount of communication resources than those for STA1 and STA4 for STA2 and STA3 having a larger amount of information to be transmitted in the EHT BFRP trigger frame. Accordingly, it is possible to realize reduction in overall feedback time.

At time B07, STA1 and STA4 transmit feedback signals including transmission weight information of AP1 (AP1 Info) on the basis of the EHT BFRP trigger frame and then transmit feedback signals including transmission weight information of AP2 (AP2 Info). STA2 and STA3 transmit feedback signals including transmission weight information of AP1+AP2 (AP1 Info+AP2 Info) on the basis of the EHT BFRP trigger frame.

At time B08, AP1 completes reception of the feedback signals transmitted from STA1 to STA4.

Meanwhile, the present technology is not limited to the example of FIG. 24 and, for example, AP1 may receive feedback signals for JTX from STA2 and STA3 in advance and then receive feedback signals for CTX from STA1 and STA4. Further, AP1 may request transmission weight information of either one of the APs alone as in the first embodiment.

<Example of Format of EHT NDP-A Frame>

The EHT NDP-A frame in the third embodiment is configured to be the same as the example of FIG. 13 described above in the first embodiment.

In the case of the third embodiment, at least one of a reception SNR, a reception RSSI difference, a channel correlation value, a reception time difference, and a transmission weight power difference is designated in Short Feedback Condition.

For example, a reception time difference means a difference between arrival times of NDP frames transmitted from AP1/AP2, and an STA can determine whether a feedback signal for JTX can be correctly received depending on the size of this reception time difference. In addition, if a reception RSSI difference between NDP frames transmitted from AP1/AP2 and a difference between powers transmitted from AP1/AP2 at the time of calculating transmission weights for JTX are large, the STA can determine that a sufficient gain is obtained using CTX instead of JTX.

<Example of Format of Short Feedback Request Frame>

The short feedback request frame in the third embodiment is configured to be the same as the example of FIG. 14 described above in the first embodiment.

<Example of Format of Short Feedback Response Frame>

The short feedback response frame in the third embodiment is configured to be the same as the example of FIG. 15 described above in the first embodiment.

In the case of the third embodiment, Short Feedback Result Info field may represent that, for example, a coordination method to be used is any one of "both JTX/CTX are available", "only JTX is available", "only CTX is available", and "both are not available" using 2-bit information.

<Example of Format of EHT BFRP Trigger Frame>

The EHT BFRP trigger frame in the third embodiment is configured to be the same as the example of FIG. 16 described above in the first embodiment.

In the case of the third embodiment, Feedback Content ID designates that the content of feedback is any one of a feedback signal for JTX (transmission weight information of AP1+AP2), a feedback signal for CTX (transmission weight information of AP1+transmission weight information of AP2), and a feedback signal of transmission weight information of any one of the APs.

Meanwhile, if the number of APs becomes three or more, an AP needs to notify other APs of a combination of APs to which transmission weight information for JTX will be fed back and identification number of APs to which transmission weight information for CTX will be fed back.

6. FOURTH EMBODIMENT (EXAMPLE OF TRANSMITTING TRANSMISSION WEIGHT INFORMATION TO ADDRESS BASED ON EXCHANGE OF SHORT REQ./RESP)

In the first embodiment, an example in which all feedback signals that are transmission weight information of AP1+ AP2 are transmitted to AP1 (one of APs) has been described above with reference to FIG. 22.

Here, transmission weights generated in APs may not be identical even if the APs can hold information on the same feedback signals because a transmission weight generation method is highly likely to depend on a device when a coordination operation, particularly, JTX is performed.

Accordingly, an operation of calculating an optimal transmission weight on the basis of information received (collected) by any one AP (AP1 in the case of the first embodiment) and sharing the transmission weight with another AP (AP2 in the case of the first embodiment) is desirable when JTX is performed. Therefore, it is assumed that STAs transmit feedback signals to AP1.

In this case, however, all STAs may not necessarily transmit feedback signals to AP1. A feedback signal from an STA (e.g., STA4 in FIG. 4) far away from AP1 may not arrive at AP1 depending on a transmission power value of the STA.

Even if AP1 barely receives the feedback signal, for example, a data rate of the feedback signal may decrease and a feedback signal transmission time may increase. For such an STA, it is desirable that an AP which will be connected thereto (AP2 in the case of an example of FIG. 25 which will be describe later) receive the feedback signal from the STA and then transmit the feedback signal to AP1.

Next, an example in which an address of a feedback signal is determined on the basis of exchange of Short Req./Resp of the first embodiment in the fourth embodiment will be described.

Meanwhile, an overall sequence in the fourth embodiment is basically the same as that in the first embodiment and thus description thereof is omitted.

<Example of EHT Sounding Sequence>

Figure 25:
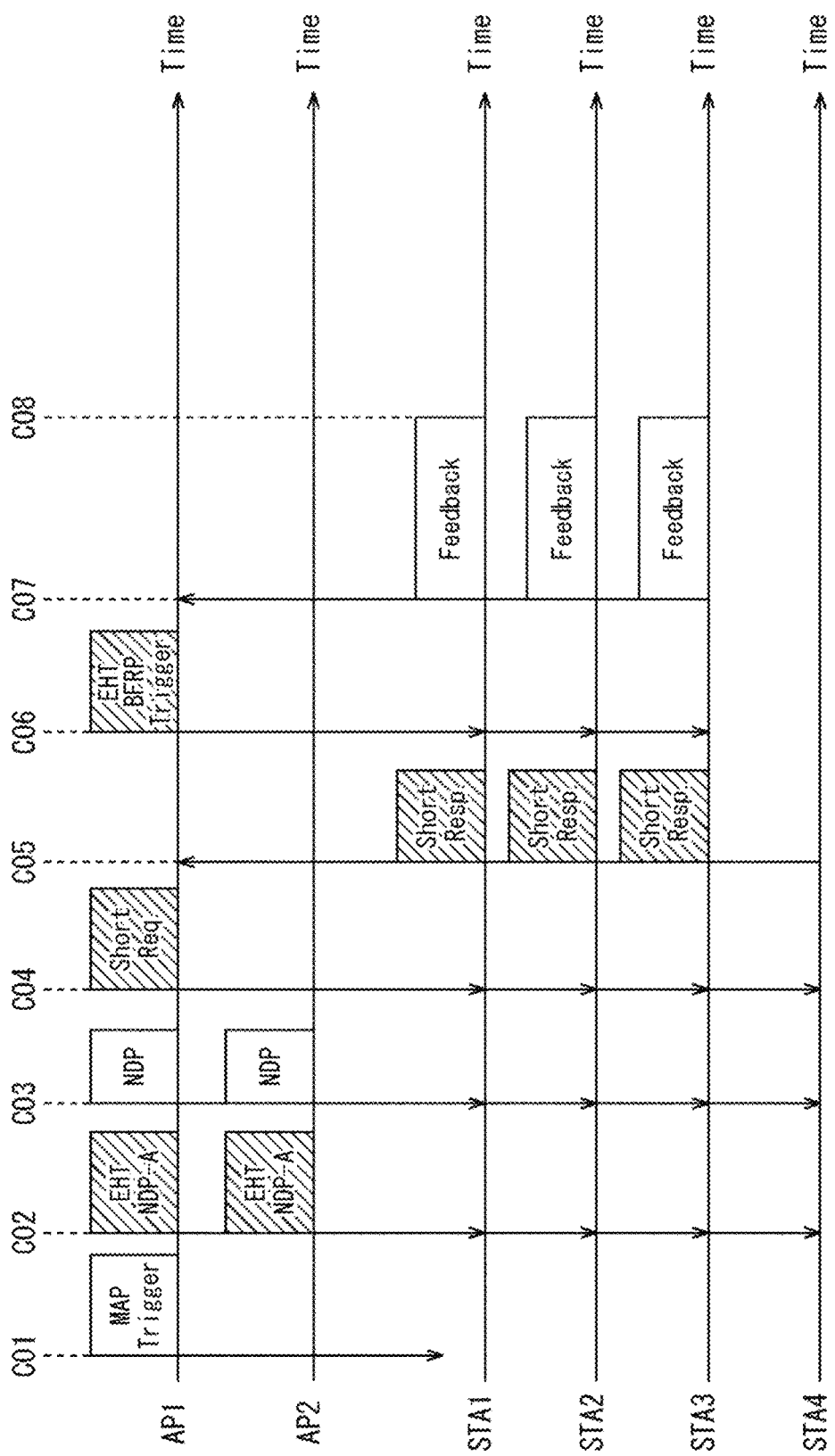
FIG. 25 is a diagram illustrating an example of a sequence of EHT sounding of a fourth embodiment of the present technology.
Figure 26:
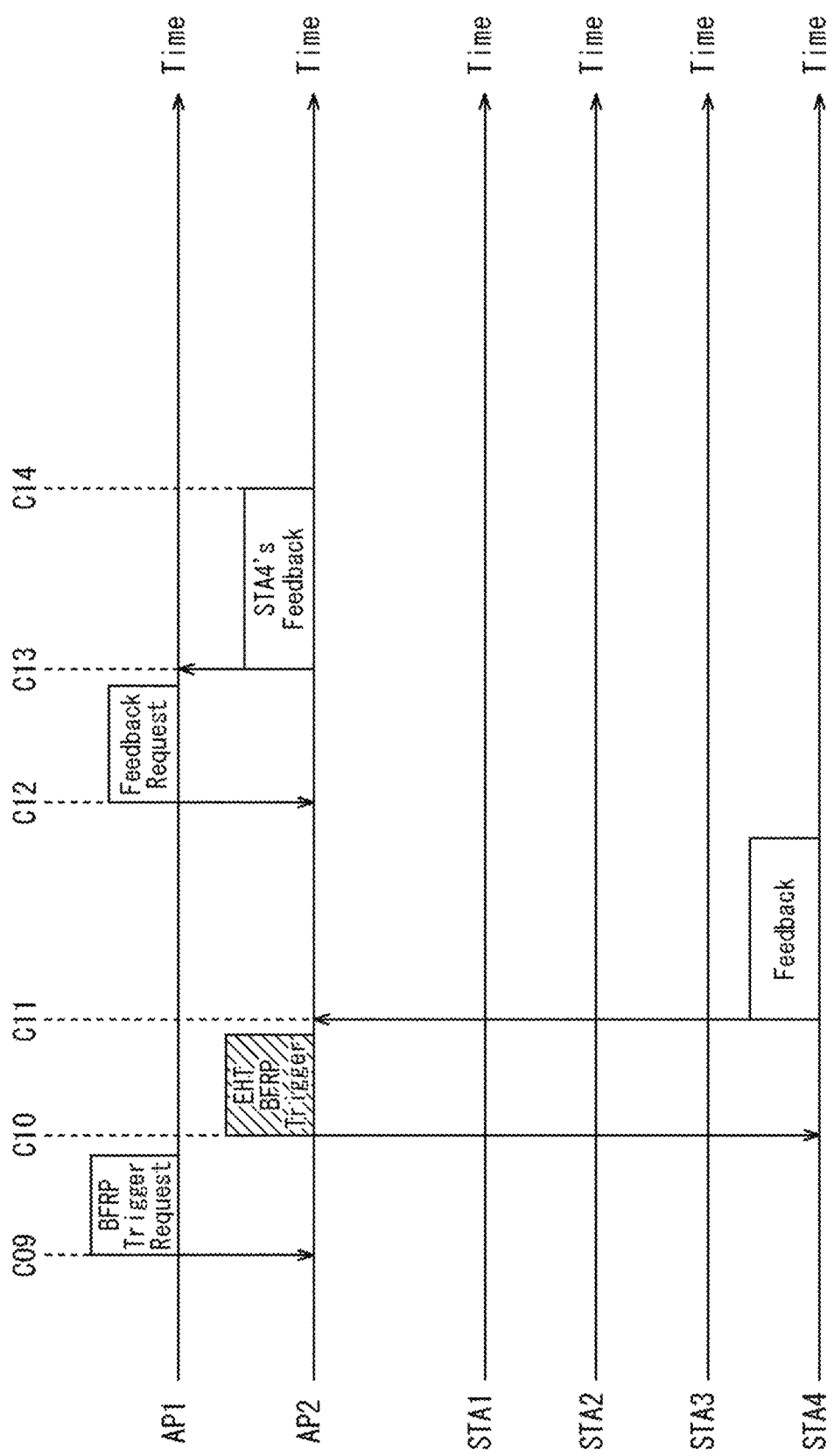
FIG. 26 is a diagram illustrating an example of a sequence subsequent to FIG. 25 in EHT sounding of the fourth embodiment of the present technology.

FIG. 25 and FIG. 26 are diagrams illustrating an example of an EHT sounding sequence of the present technology.

A sequence of time C01 to time C04 in FIG. 25 is the same as the sequence of time T01 to T04 in FIG. 10. Description of the same processing as that of FIG. 10 will be appropriately omitted. Details of processing will be appropriately omitted with respect to the same parts as those of FIG. 10.

At time C01, AP1 transmits a MAP trigger to AP2. AP2 generates an EHT NDP-A frame and an NDP frame on the basis of the content written in the MAP trigger.

At time C02, AP1 and AP2 transmits EHT NDP-A frames.

At time C03, AP1 and AP2 transmit NDP frames.

At time C04, AP1 transmits a short feedback request frame to STA1 to STA4.

At time C05, STA1 to STA3 transmit short feedback response frames including second measurement result on the basis of a reception state of the NDP frames transmitted from AP1 and AP2 after receiving the short feedback request frame from AP1.

Here, STA4 determines whether to transmit a short feedback response frame on the basis of information of Feedback Condition and Threshold written in the EHT NDP-A frame transmitted from AP1. In the case of FIG. 25, STA4 does not transmit the short feedback response frame.

AP1 determines that it does not receive (does not collect) a feedback signal from STA4 on the basis of exchange of Short Req./Resp.

At time C06, AP1 generates an EHT BFRP trigger frame on the basis of the aforementioned determination result and transmits the EHT BFRP trigger frame to STA1 to STA3. Meanwhile, even when STA4 has returned the short feedback response frame, AP1 may determine that it does not directly receive a feedback signal from STA4 on the basis of the content of the short feedback response frame.

At time C07, STA1 to STA3 transmit feedback signals on the basis of the EHT BFRP trigger frame.

At time C08, AP1 completes reception of the feedback signals transmitted from STA1 to STA3.

At time C09 in FIG. 26, AP1 generates a BFRP trigger request frame for requesting transmission of an EHT BFRP trigger frame to STA4 and transmits the BFRP trigger request frame to AP2.

At time C10, AP2 that has received the BFRP trigger request frame generates an EHT BFRP trigger frame on the basis of the received BFRP trigger request frame and transmits the EHT BFRP trigger frame to STA4.

At time C11, STA4 transmits a feedback signal to AP2 on the basis of the received EHT BFRP trigger frame.

At time C12, AP1 generates a feedback request frame for requesting the feedback signal from STA4 and transmits the feedback request frame to AP2.

At time C13, AP2 receives the feedback request frame and transmits the feedback signal of STA4 to AP1 on the basis of the received feedback request frame.

At time C14, AP1 completes reception of the feedback signal of STA4 transmitted from AP2.

Meanwhile, in the fourth embodiment, a feedback signal may be a signal for any of JTX and CTX described above in the third embodiment irrespective of the amount and type of information to be fed back. In addition, upon determining that STA4 is far away from AP1 and thus interference from AP1 does not become a problem, AP1 may not transmit a feedback request to AP2 and may not receive the feedback signal of STA4.

<Example of Format of EHT NDP-A Frame>

The EHT NDP-A frame in the fourth embodiment is configured to be the same as the example of FIG. 13 described above in the first embodiment.

<Example of Format of Short Feedback Request Frame>

The short feedback request frame in the fourth embodiment is configured to be the same as the example of FIG. 14 described above in the first embodiment.

Further, the short feedback request frame includes transmission power information of APs and a target RSSI value. STAs can determine whether to transmit feedback signals on the basis of such information.

<Example of Format of Short Feedback Response Frame>

The short feedback response frame in the fourth embodiment is configured to be the same as the example of FIG. 15 described above in the first embodiment.

In the case of the fourth embodiment, an STA may include a flag such as "direct feedback response to AP1 is OK" or "NG" in the content of Short Feedback Result Info field and notify an AP of the content of Short Feedback Result Info field. Further, the STA may include an identifier of an AP to which the STA can transmit feedback response in the content of this field and notify the AP of the content of the field.

<Example of Format of EHT BFRP Trigger Frame>

The EHT BFRP trigger frame in the fourth embodiment is configured to be the same as the example of FIG. 16 described above in the first embodiment.

<Example of Format of BFRP Trigger Request Frame>

Figure 27:
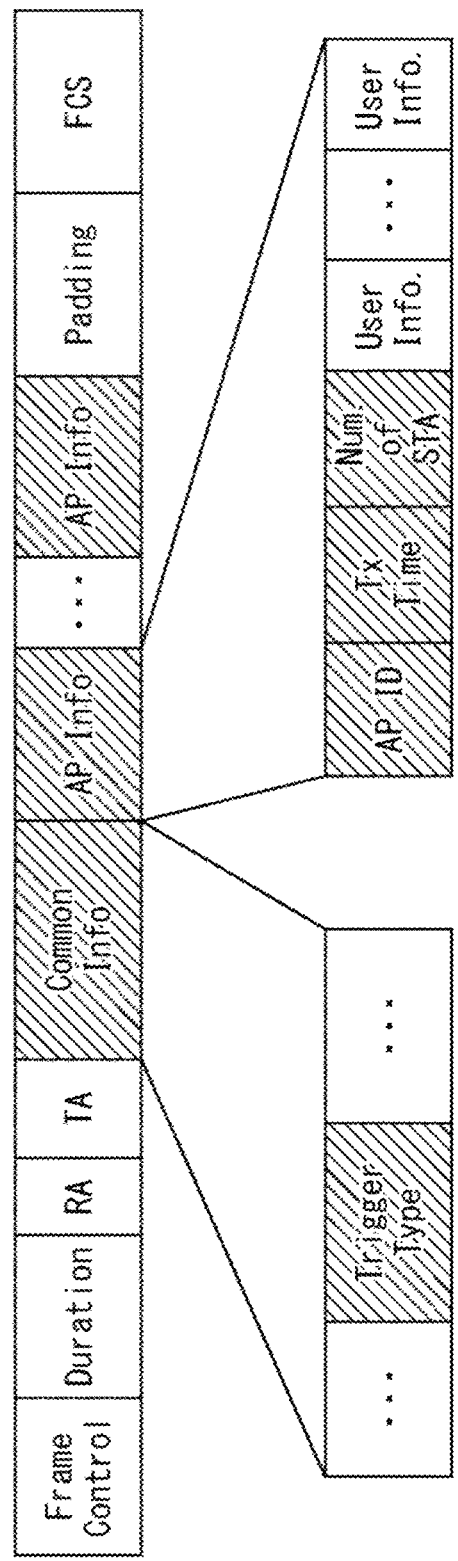
FIG. 27 is a diagram illustrating an example of a format of a BFRP trigger request frame.

FIG. 27 is a diagram illustrating an example of a format of the BFRP trigger request frame.

The BFRP trigger request frame is a frame for requesting, to another AP, transmission of the EHT BFRP trigger frame to an STA designated by this frame.

The BFRP trigger request frame includes Frame Control, Duration, RA, TA, Common Info, AP Info, Padding, and FCS fields.

The Frame Control field includes information representing that this frame is the BFRP trigger request frame.

The Common Info field includes information common for all STAs to which this frame will be transmitted. The present technology is characterized in that Trigger Type in Common Info represents that this frame is the BFRP trigger request frame.

AP Info includes information (User Info.) about an AP identifier (AP ID), transmission timing information (Tx Time) of the EHT BFRP trigger frame, the number of STAs (Num. of STA) from which feedback signals will be received, and identifier and resource information of each AP.

<Example of Format of Feedback Request Frame>

Figure 28:
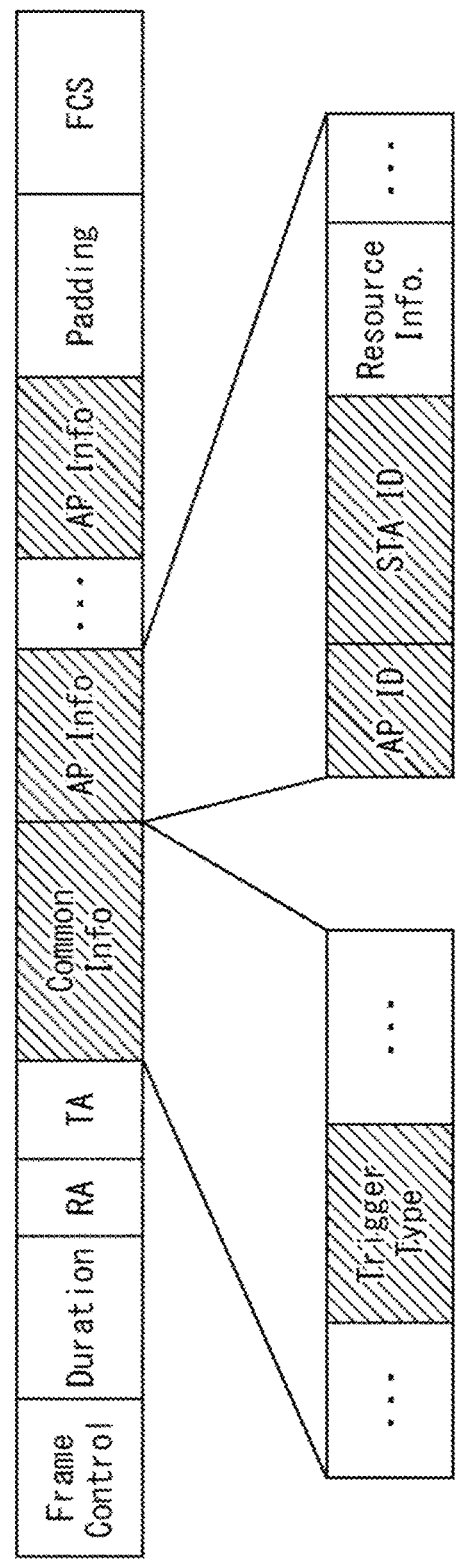
FIG. 28 is a diagram illustrating an example of a format of a feedback request frame.

FIG. 28 is a diagram illustrating an example of a format of the feedback request frame.

The feedback request frame is a frame for requesting a feedback signal of an STA designated by this frame from another AP.

The feedback frame includes Frame Control, Duration, RA, TA, Common Info, AP Info, Padding, and FCS fields.

The Frame Control field includes information representing that this frame is the feedback request frame.

The Common Info field includes information common for all STAs to which this frame will be transmitted. The present technology is characterized in that Trigger Type in Common Info represents that this frame is the feedback request frame.

AP Info includes information (Resource Info.) about an AP identifier (AP ID), an identifier of an STA (STA ID) from which a feedback signal will be received, and resource information of each AP.

<Operation of Device>

Figure 29:
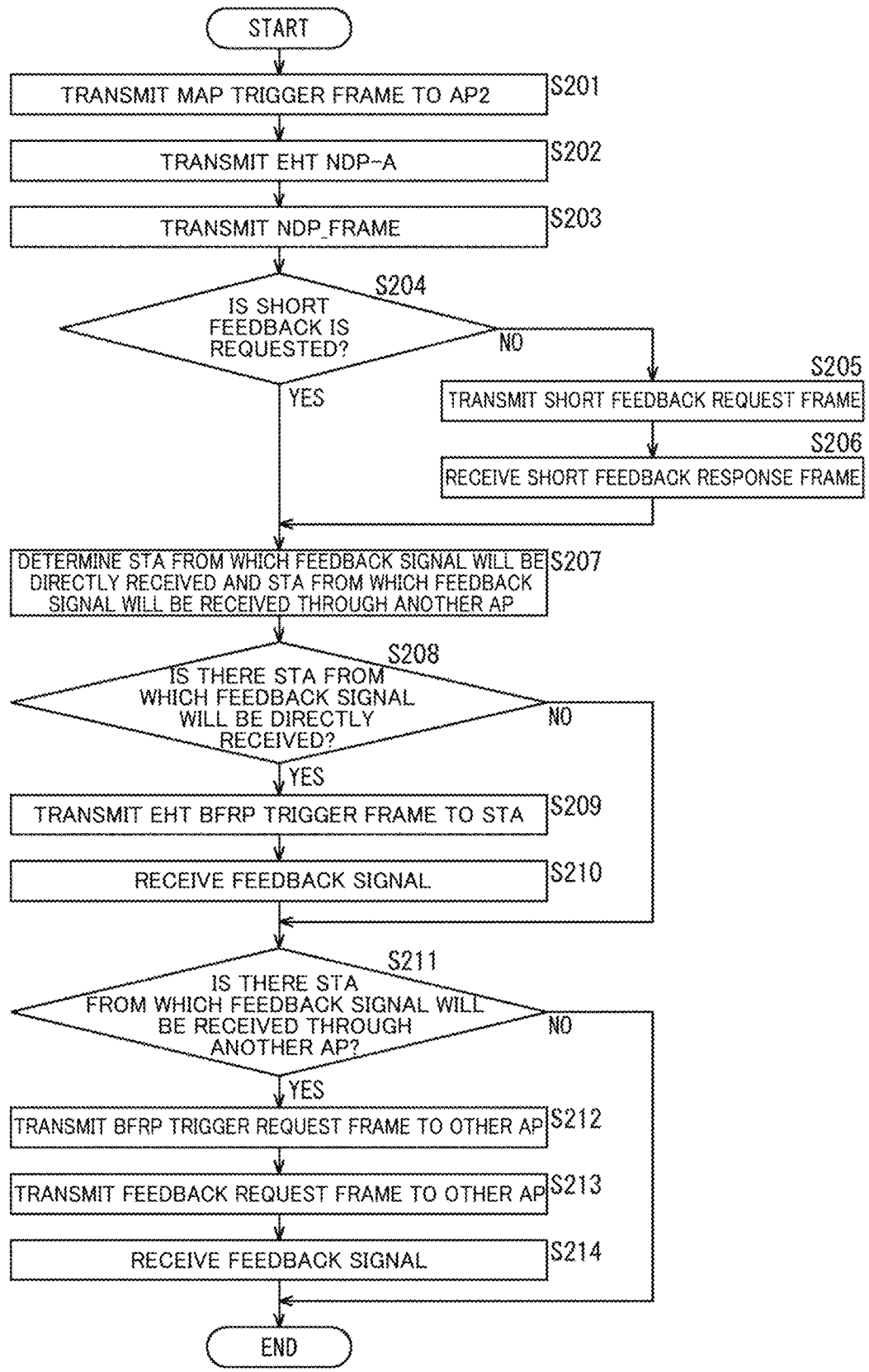
FIG. 29 is a flowchart describing EHT sounding processing of AP1.

FIG. 29 is a flowchart describing EHT sounding processing of the wireless communication device 11-1 operating as AP1.

Meanwhile, steps S201 to S206 of FIG. 29 are basically the same as steps S56 to S61 of FIG. 17 and thus description thereof is omitted.

In step S207, the communication control unit 31 determines an STA from which a feedback signal will be directly received and an STA from which a feedback signal will be received through another AP on the basis of information that can be acquired from the short feedback response frame.

In step S208, the communication control unit 31 determines whether there is an STA from which a feedback signal will be directly received. If it is determined that there is an STA from which a feedback signal will be directly received in step S208, processing proceeds to step S209.

In step S209, the communication control unit 31 generates an EHT BFRP trigger frame (FIG. 16) for the STA from which a feedback signal will be directly received and causes the wireless transmission unit 41 to transmit the EHT BFRP trigger frame.

Upon reception of the EHT BFRP trigger frame and determining that a feedback signal needs to be transmitted on the basis of the EHT BFRP trigger frame, the STA transmits the feedback signal. In step S209, the wireless reception unit 42 receives the feedback signal. When the feedback signal is received, processing proceeds to step S211.

On the other hand, if it is determined that there is no STA from which a feedback signal will be directly received in step S208, processing of steps S209 and S210 is skipped and processing proceeds to step S211.

In step S211, the communication control unit 31 determines whether there is an STA from which a feedback signal will be received through another AP. If it is determined that there is an STA from which a feedback signal will be received through another AP in step S211, processing proceeds to step S212.

In step S212, the communication control unit 31 generates a BFRP trigger request frame (FIG. 27) for the other AP and causes the wireless transmission unit 41 to transmit the BFRP trigger request frame.

Upon reception of the BFRP trigger request frame, the other AP (e.g., AP2) transmits the EHT BFRP trigger frame to the target STA and receives a feedback signal from the target STA.

In step S213, the communication control unit 31 generates a feedback request frame (FIG. 28) for the other AP and causes the wireless transmission unit 41 to transmit the feedback request frame.

Upon reception of the feedback request frame, the other AP (e.g., AP2) transmits the feedback signal for the target STA to AP1.

In step S214, the wireless reception unit 42 receives the feedback signal. When the feedback signal is received, EHT sounding processing ends.

If it is determined that there is no STA from which a feedback signal will be received through another AP in step S211, processing of steps S212 to S214 is skipped and EHT sounding processing end.

7. OTHERS

Advantageous Effects of Present Technology

As described above, in the present technology, information exchange between a short feedback request that is a second measurement result request signal and a response that is a second measurement result is performed between transmission of an NDP frame in a known pattern and reception of a feedback signal that is a first measurement result.

Accordingly, an AP can optimally allocate feedback signal request destinations and communication resources of feedback signals.

In the first embodiment, it is possible to distribute communication resources depending on the amount of information acquired from STAs by determining the amount of information in advance.

In addition, in the second embodiment, it is possible to allocate communication resources of STAs from which feedback signals are not requested to STAs from which a feedback signal are requested by limiting STAs from which feedback signals are requested.

When consideration is limited to the communication system of the present embodiment, if a conventional method is applied to a plurality of APs, each of four STAs transmits a feedback signal corresponding to two APs. On the other hand, in the case of the present technology, two STAs transmit feedback signals for two APs and two other STAs transmit feedback signals for one AP and thus the amount of information of feedback signals to be transmitted is reduced 25% and a transmission time is reduced by a maximum of about 2 ms.

The present technology can expect greater effects as the number of streams increases or the number of STAs increases. On the other hand, even if the amount of information of feedback signals cannot be reduced due to positional relations between APs and STAs, a transmission time increases by merely 0.2 ms for exchange of short feedback request/response.

Furthermore, in the third embodiment, it is possible to reduce a feedback signal transmission time by determining a coordination method on the basis of exchange of short feedback request/response.

For example, in contrast with acquisition of feedback signals for JTX from four STAs, feedback signals for CTX are acquired from two of the four STAs to reduce the amount of received information approximately 20% to 40% (depending on the number of transmission antennas and the number of reception antennas).

Furthermore, in the fourth embodiment, it is possible to increase, for example a data rate of feedback signals by determining a method a route for receiving feedback signals on the basis of short feedback request/response. This makes it possible to reduce a feedback signal transmission time.

<Configuration Example of Computer>

The above-described series of processing can also be performed by hardware or software. When the series of processing is performed by software, a program for the software is embedded in dedicated hardware to be installed from a program recording medium to a computer or a general-purpose personal computer.

Figure 30:
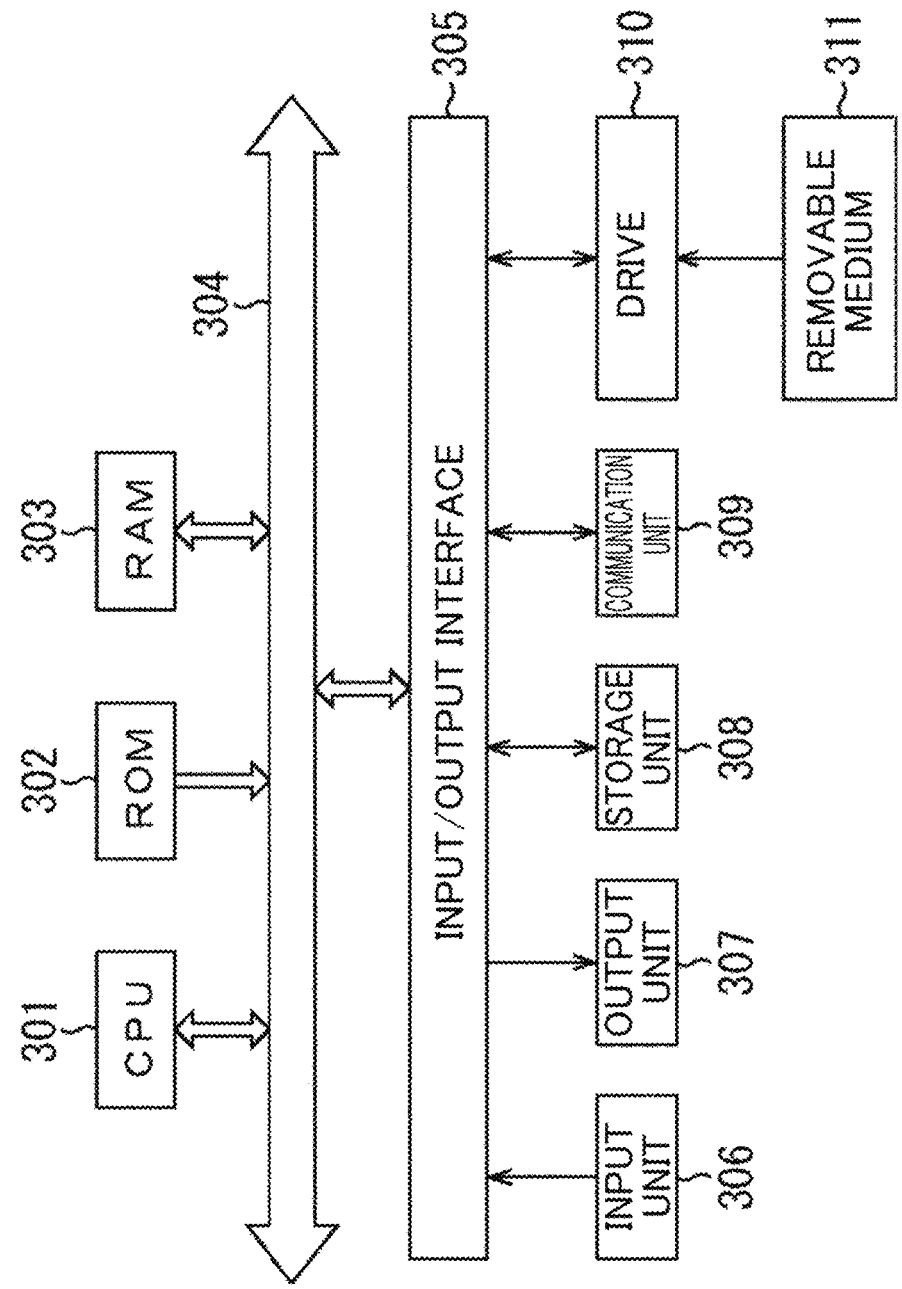
FIG. 30 is a block diagram illustrating a configuration example of a computer.

FIG. 30 is a block diagram illustrating a configuration example of hardware of a computer that executes a program to perform the above-described series of processing.

A central processing unit (CPU) 301, a read only memory (ROM) 302, and a random access memory (RAM) 303 are connected via a bus 304.

An input/output interface 305 is further connected to the bus 304. An input unit 306 including a keyboard and a mouse and an output unit 307 including a display and a speaker are connected to the input/output interface 305. A storage unit 308 including a hard disk or a nonvolatile memory, a communication unit 309 including a network interface, a drive 310 driving a removable medium 311 are connected to the input/output interface 305.

In the computer that has the aforementioned configuration, for example, the CPU 301 loads a program stored in the storage unit 308 to the RAM 303 via the input/output interface 305 and the bus 304 and executes the program to perform the above-described series of processing.

The program executed by the CPU 301 is recorded on, for example, the removable medium 311 or is provided via a wired or wireless transfer medium such as a local area network, the Internet, or digital broadcast to be installed in the storage unit 308.

The program executed by the computer may be a program that performs processes chronologically in the procedure described in the present specification or may be a program that performs a process at a necessary timing such as in parallel or upon being called.

In the present specification, a system is a set of a plurality of constituent elements (devices, modules (components), or the like) and all the constituent elements may be located or not located in the same casing. Therefore, a plurality of devices housed in separate housings and connected via a network, and one device in which a plurality of modules are housed in one housing are both systems.

The advantages described in the present specification are merely exemplary and not limited, and other advantages may be obtained.

The embodiments of the present technology are not limited to the above-described embodiments, and various modifications can be made without departing from the gist of the present technology.

For example, the present technology can be configured as cloud computing in which one function is shared and processed in common by a plurality of devices via a network.

Further, the respective steps described in the above-described flowcharts can be executed by one device or in a shared manner by a plurality of devices.

Furthermore, in a case where a plurality of kinds of processing are included in a single step, the plurality of kinds of processing included in the single step may be executed by one device or by a plurality of devices in a shared manner.

<Combination Examples of Configurations>

The present technology can be configured as follows.

(1)

A wireless communication device including a wireless transmission unit, and a communication control unit configured to cause the wireless transmission unit to transmit a reference signal in a known pattern addressed to a wireless communication terminal in coordination with one or more other wireless communication devices, to generate a request signal for requesting a second measurement result simpler than a first measurement result of the reference signal from the wireless communication terminal, and to cause the wireless transmission unit to transmit the request signal.

(2)

The wireless communication device according to (1), wherein the communication control unit determines feedback information about a feedback signal including the measurement result requested from the wireless communication terminal on the basis of the measurement result information acquired from the wireless communication terminal that has received the request signal.

(3)

The wireless communication device according to (2), wherein the communication control unit determines, as the information about the feedback signal, at least one of a request destination of the feedback signal, an amount of information of the feedback signal, communication resources of the feedback signal, and whether the feedback signal has been directly received or received through the other wireless communication device.

(4)

The wireless communication device according to (2) or (3), wherein the communication control unit generates a trigger signal including the communication resources of the feedback signal and indication information indicating the content of the first measurement result included in the feedback signal for the wireless communication terminal requested to transmit the feedback signal, and the wireless transmission unit transmits the trigger signal.

(5)

The wireless communication device according to (4), wherein the communication control unit indicates, as the content of the first measurement result, transmission of only the first measurement result with respect to the wireless communication device or transmission of the first measurement result with respect to the other wireless communication device in addition to the first measurement result with respect to the wireless communication device in the indication information.

(6)

The wireless communication device according to (5), wherein the communication control unit indicates whether the first measurement result regarding the other wireless communication device has been transmitted separately from or in combination with the first measurement result with respect to the wireless communication device.

(7)

The wireless communication device according to (2), wherein the communication control unit generates a request signal for requesting transmission of a trigger signal including indication information indicating the content of the first measurement result included in the feedback signal from the other wireless communication device that has requested reception of the feedback signal, and the wireless transmission unit transmits the request signal.

(8)

The wireless communication device according to (7), wherein the communication control unit generates a trigger signal including information about the communication resources of the feedback signal and indication information indicating the content of the first measurement result included in the feedback signal when the other wireless communication device requests reception of the feedback signal, and the wireless transmission unit transmits the trigger signal to the wireless communication terminal.

(9)

The wireless communication device according to (1), wherein the communication control unit generates an advance notification signal including indication information indicating at least one of information about a determination method for obtaining the second measurement result and information about a determination threshold value, and the wireless transmission unit transmits the advance notification signal.

(10)

The wireless communication device according to (9), wherein the communication control unit generates the advance notification signal including the indication information indicating at least one of a reception power value, a correlation value of an estimated channel, a signal arrival time difference, and a transmission weight power difference as the determination method.

(11)

The wireless communication device according to (9), wherein the communication control unit generates the advance notification signal including the indication information indicating an absolute threshold value, a relative value with respect to the reference signal transmitted from the wireless communication device, or a calculation method of the relative value as the determination threshold value.

(12)

The wireless communication device according to any one of (1) to (11), wherein the communication control unit generates a coordination request signal including indication information indicating at least one of information about a determination method for obtaining the second measurement result and information about a determination threshold value, and the wireless transmission unit transmits the coordination request signal to the other wireless communication device.

(13)

The wireless communication device according to any one of (1) to (12), wherein the communication control unit collects measurement result response information representing whether it is possible to respond to the second measurement result from the subordinate wireless communication terminal.

(14)

The wireless communication device according to (13), wherein the communication control unit causes the measurement result response information to be shared with the other wireless communication device.

(15)

A wireless communication method, using a wireless communication device, including transmitting a reference signal in a known pattern addressed to a wireless communication terminal in coordination with one or more other wireless communication devices, generating a request signal for requesting a second measurement result simpler than a first measurement result of the reference signal from the wireless communication terminal, and transmitting the request signal.

(16)

A wireless communication terminal including a communication control unit configured to, on the basis of a reference signal in a known pattern transmitted from a plurality of wireless communication devices in a coordinated manner, generate a second measurement result simpler than a first measurement result of the reference signal, and a wireless transmission unit configured to transmit a response signal including the second measurement result to the wireless communication device that is a request destination on the basis of a request signal for requesting the second measurement result.

(17)

The wireless communication terminal according to (16), wherein the communication control unit generates the second measurement result on the basis of information about a determination method and information about a determination threshold value in an advance notification signal transmitted from the wireless communication device.

(18)

The wireless communication terminal according to (16) or (17), wherein, on the basis of resources of a feedback signal included in a trigger signal and a type of the measurement result included in the feedback signal, the communication control unit generates the feedback signal including the measurement result, and the wireless transmission unit transmits the feedback signal.

(19)

The wireless communication terminal according to (18), wherein the communication control unit includes only the first measurement result of the reference signal transmitted from the wireless communication device that is a transmission source of the trigger signal in the feedback signal as the content of the first measurement result.

(20)

The wireless communication terminal according to (18), wherein the communication control unit includes the first measurement result of all received reference signals in the feedback signal as the content of the first measurement result.

(21)

A wireless communication method, by a wireless communication terminal, including, on the basis of a reference signal in a known pattern transmitted from a plurality of wireless communication devices in a coordinated manner, generating a second measurement result simpler than a first measurement result of the reference signal, and transmitting a response signal including the second measurement result to a wireless communication device that is a request destination on the basis of a request signal for requesting the second measurement result.

REFERENCE SIGNS LIST

11 Communication device
21 Wireless signal processing unit
22-1, 22-2 Wireless communication unit
31 Communication control unit
33 Data processing unit
51 Communication terminal
61 Wireless signal processing unit
62-1, 62-2 Wireless communication unit
71 Communication control unit
73 Data processing unit

The invention claimed is:

1. A wireless communication device comprising:
a wireless transmission circuit, and
a communication control circuit configured to:
cause the wireless transmission circuit to transmit a reference signal having a known pattern to a wireless communication terminal in coordination with one or more other wireless communication devices,
generate a request signal for requesting a second measurement result smaller than a first measurement result of the reference signal from the wireless communication terminal,
wherein the first measurement result comprises unshortened null data packet (NDP) information and the second measurement result comprises shortened NDP information,
cause the wireless transmission circuit to transmit the request signal and receive the second measurement result in response to the request signal, and
process the second measurement result.

2. The wireless communication device according to claim 1,
wherein, based on the second measurement result that has been received from the wireless communication terminal, the communication control circuit determines information about a feedback signal, the information about the feedback signal including a request for the first measurement result from the wireless communication terminal.

3. The wireless communication device according to claim 2, wherein the communication control circuit determines as the information about the feedback signal, each of:
a request destination of the feedback signal,
an amount of information of the feedback signal,
communication resources of the feedback signal, and
whether the feedback signal has been directly received or has been received through the other wireless communication device.

4. The wireless communication device according to claim 2, wherein
the communication control circuit generates a trigger signal, the trigger signal including:
the communication resources of the feedback signal, and
indication information indicating a content of the first measurement result included in the feedback signal, and
the wireless transmission circuit transmits the trigger signal.

5. The wireless communication device according to claim 4, wherein the communication control circuit indicates, as the content of the first measurement result, transmission of only the first measurement result with respect to the wireless communication device or transmission of the first measurement result with respect to the other wireless communication device in addition to the first measurement result with respect to the wireless communication device in the indication information.

6. The wireless communication device according to claim 5, wherein the communication control circuit indicates whether the first measurement result regarding the other wireless communication device has been transmitted separately from or in combination with the first measurement result with respect to the wireless communication device.

7. The wireless communication device according to claim 2, wherein
the communication control circuit generates a request signal for requesting transmission of a first trigger signal including indication information indicating a content of the first measurement result included in the feedback signal from the other wireless communication device that has requested reception of the feedback signal, and
the wireless transmission circuit transmits the request signal.

8. The wireless communication device according to claim 7, wherein
the communication control circuit generates a second trigger signal including information about the communication resources of the feedback signal and indication information indicating the content of the first measurement result included in the feedback signal when the other wireless communication device requests reception of the feedback signal, and
the wireless transmission circuit transmits the second trigger signal to the wireless communication terminal.

9. The wireless communication device according to claim 1,
wherein the communication control circuit generates an advance notification signal including indication information, the indication information of the advance notification signal indicating each of:
information about a determination method for obtaining the second measurement result, and
information about a second measurement result determination threshold value, and
wherein the wireless transmission circuit transmits the advance notification signal.

10. The wireless communication device according to claim 9,
wherein the second measurement result determination threshold value comprises at least one of:
a reception power value,
a correlation value of an estimated channel,
a signal arrival time difference, or
a transmission weight power difference.

11. The wireless communication device according to claim 9, wherein the indication information indicates at least one of:
an absolute threshold value as the second measurement result determination threshold value,
a relative value with respect to the reference signal transmitted from the wireless communication device as the second measurement result determination threshold value, or
a calculation method of the relative value as the second measurement result determination threshold value.

12. The wireless communication device according to claim 1, wherein
the communication control circuit generates a coordination request signal including indication information indicating at least one of information about a determination method for obtaining the second measurement result or information about a determination threshold value, and
the wireless transmission circuit transmits the coordination request signal to the one or more other wireless communication devices.

13. The wireless communication device according to claim 1, wherein the communication control circuit collects measurement result response information representing whether it is possible to respond to the second measurement result from a subordinate wireless communication terminal of the one or more other wireless communication devices.

14. The wireless communication device according to claim 13, wherein the communication control circuit causes the measurement result response information to be shared with the one or more other wireless communication devices.

15. A wireless communication method performed by a wireless communication device, the wireless communication method comprising:
- transmitting a reference signal having a known pattern to a wireless communication terminal in coordination with one or more other wireless communication devices,
- generating a request signal for requesting a second measurement result smaller than a first measurement result of the reference signal from the wireless communication terminal,
- wherein the first measurement result comprises unshortened null data packet (NDP) information and the second measurement result comprises shortened NDP information,
- transmitting the request signal,
- receiving the second measurement result in response to the request signal, and
- processing the second measurement result.

16. A wireless communication terminal comprising:
- a communication control circuit configured to, based on a reference signal having a known pattern that is received from a plurality of wireless communication devices in a coordinated manner, generate a second measurement result smaller than a first measurement result of the reference signal,
- wherein the first measurement result comprises unshortened null data packet (NDP) information and the second measurement result comprises shortened NDP information, and
- a wireless transmission circuit configured to transmit a response signal including the second measurement result to a wireless communication device of the plurality of wireless communication devices that is a request destination, the request destination being determined based on a request signal that is received by the wireless communication terminal of the plurality of wireless communication devices, the request signal being a signal for requesting the second measurement result.

17. The wireless communication terminal according to claim 16, wherein the communication control circuit generates the second measurement result based on information about a determination method and information about a determination threshold value that is received in an advance notification signal that is received from the wireless communication device of the plurality of wireless communication devices.

18. The wireless communication terminal according to claim 16, wherein, based on communication resources of a feedback signal included in a trigger signal transmitted from the wireless communication device of the plurality of wireless communication devices and a content of the first measurement result included in the feedback signal, the communication control circuit generates the feedback signal including the first measurement result, and
the wireless transmission circuit transmits the feedback signal.

19. The wireless communication terminal according to claim 18, wherein the communication control circuit only includes a measurement result of the reference signal that is transmitted from the wireless communication device of the plurality of wireless communication devices that is a transmission source of the trigger signal in the feedback signal as the content of the first measurement result.

20. The wireless communication terminal according to claim 18, wherein the communication control circuit includes measurement results of all reference signals received from the plurality of wireless communication devices in the feedback signal as the content of the first measurement result.

* * * * *